(12) United States Patent
Tubert et al.

(10) Patent No.: US 12,306,039 B2
(45) Date of Patent: May 20, 2025

(54) LIGHT SENSOR

(71) Applicants: STMicroelectronics (Grenoble 2) SAS, Grenoble (FR); STMicroelectronics (Crolles 2) SAS, Crolles (FR)

(72) Inventors: Cedric Tubert, Saint-Egreve (FR); Matteo Maria Vignetti, Aix les Bains (FR)

(73) Assignees: STMicroelectronics (Grenoble 2) SAS, Grenoble (FR); STMicroelectronics (Crolles 2) SAS, Crolles (FR)

( * ) Notice: Subject to any disclaimer, the term of this patent is extended or adjusted under 35 U.S.C. 154(b) by 0 days.

(21) Appl. No.: 18/524,960

(22) Filed: Nov. 30, 2023

(65) Prior Publication Data

US 2024/0192053 A1 Jun. 13, 2024

(30) Foreign Application Priority Data

Dec. 13, 2022 (FR) ...................................... 2213210

(51) Int. Cl.
*G01J 1/44* (2006.01)
(52) U.S. Cl.
CPC ........... *G01J 1/44* (2013.01); *G01J 2001/446* (2013.01)

(58) Field of Classification Search
CPC ...... G01J 1/44; G01J 2001/446; H04N 25/42; H04N 25/778; H04N 25/46
See application file for complete search history.

(56) References Cited

U.S. PATENT DOCUMENTS

| | | | |
|---|---|---|---|
| 2006/0243890 A1 | 11/2006 | Bock | |
| 2010/0118167 A1* | 5/2010 | Johnson | ................ H04N 25/59 348/E5.022 |
| 2010/0182465 A1 | 7/2010 | Okita | |
| 2012/0312963 A1 | 12/2012 | Storm et al. | |
| 2016/0337567 A1 | 11/2016 | Okura et al. | |

* cited by examiner

*Primary Examiner* — Georgia Y Epps
*Assistant Examiner* — Monica T Taba
(74) *Attorney, Agent, or Firm* — Slater Matsil, LLP

(57) ABSTRACT

An embodiment light sensor includes an array of pixels arranged in rows and in columns. Each pixel comprises a photodiode, a sense node coupled to the photodiode, and an initialization transistor connected to the sense node. N successive pixels of a column or of a row are associated, where N is greater than or equal to 2. The initialization transistor of a first one of the pixels arranged at one end of the association of the N pixels is connected between the sense node of the first one of the pixels and a node of application of an initialization potential. For each two successive pixels among the N pixels, the initialization transistor of one of the pixels that is the most distant from the end is connected between the sense nodes of the two pixels.

15 Claims, 8 Drawing Sheets

LIGHT SENSOR

CROSS-REFERENCE TO RELATED APPLICATIONS

This application claims the priority benefit of French patent application number 22/13210, filed on Dec. 13, 2022, which is hereby incorporated by reference to the maximum extent allowable by law.

TECHNICAL FIELD

The present disclosure generally concerns integrated circuits and, in particular examples, light sensors.

BACKGROUND

Light sensors comprising an array of pixels arranged in rows and in columns are known.

In these known light sensors, each pixel comprises a photodiode for converting the received light into photogenerated charges, a sense node coupled to the photodiode and towards which are transferred photogenerated charges to be read during a phase of reading of the sense node, an initialization transistor connected between the sense node and a node of application of an initialization potential. In particular, in each pixel, each initialization of the potential on the sense node of the pixel or, in other words, each initialization of the sense node, comprises a setting to the conductive state of the initialization transistor of the pixel.

In some of these known sensors, sets of pixels are defined, each set for example comprising a plurality of successive pixels of a same row or of a same column. In each set of pixels, the sense nodes of the pixels are coupled two by two by charge averaging transistors (binning). In other words, in a given set of pixels, each pixel has its sense node coupled to the sense node of each of its neighboring pixels in the set by a respective charge averaging transistor. Thereby, these sensors selectively allow two operating modes.

In one operating mode, for example, called full resolution operation, the charge averaging transistors are in the non-conductive state. Thus, in each pixel of a given set, the charges photogenerated by the photodiode of the pixel and transferred onto the sense node of the pixel do not add to, or are not averaged with, charges photogenerated by the photodiode of a neighboring pixel in the set and transferred onto the sense node of this neighboring pixel.

In another operating mode, for example, called extended dynamic range operation, the charge averaging transistor connected between two neighboring pixels of a given set of pixels is set to the conductive state, for example during a phase of reading of the sense nodes of these two pixels. Thereby, the charges photogenerated by the photodiode of a first one of these two neighboring pixels and transferred to the sense node of this first pixel add to, or are averaged with, the charges photogenerated by the photodiode of a second one of these two neighboring pixels and transferred to the sense node of this second pixel, due to the coupling between these two sense nodes by the conductive state of the charge averaging transistor.

However, these known light sensors allowing the two above-described operating modes have various disadvantages. For example, these pixels are bulky

SUMMARY

Embodiments overcome all or part of the disadvantages of known light sensors allowing the two above-described operating modes.

For example, embodiments can decrease the bulk of these known sensors, for example, of each pixel of these known sensors.

An embodiment provides a light sensor comprising an array of pixels arranged in rows and in columns and a circuit for controlling the pixels. Each pixel comprises a photodiode, a sense node coupled to the photodiode, and an initialization transistor connected to the sense node. N successive pixels of a column or of a row are associated, N being an integer greater than or equal to 2. The initialization transistor of a first one of the N pixels arranged at one end of the association of the N pixels is connected between the sense node of the first pixel and a node of application of an initialization potential. For each two successive pixels among the N pixels, the initialization transistor of that of the two pixels which is the most distant from said end is connected between the sense nodes of said two pixels. The control circuit is configured to implement phases of initialization of the sense nodes of the N pixels, and, for each phase of initialization of the sense node of each of said N pixels, to keep in the conductive state simultaneously the initialization transistors coupling said sense node to the node of application of the initialization potential.

According to an embodiment, the control circuit is configured in a first operating mode where the N pixels are distributed in at least one group of at least two successive pixels among the N pixels, and for each group, to keep in the conductive state the initialization transistor connected between the sense nodes of each two successive pixels of said group.

According to an embodiment, the control circuit is configured, in a first operating mode further comprising, for each group of the first phases of transfer of photogenerated charges to the sense nodes of the pixels in the group, and of each group, to keep in the non-conductive state each initialization transistor connected between the sense node of a pixel of said group and the sense node of a pixel of another one of said groups or the node of application of the initialization potential, during each first phase of transfer of photogenerated charges to the sense nodes of the pixels of said group.

According to an embodiment, each pixel further comprises a transfer gate coupling the sense node of the pixel to the photodiode of the pixel, and the control circuit is configured to control, for each group and simultaneously for each pixel of said group, a single switching to the conductive state of the transfer gate of said pixel at each first phase of charge transfer to the sense nodes of the pixels of said group.

According to an embodiment, each pixel further comprises a transfer gate coupling the sense node of the pixel to the photodiode of the pixel, and the control circuit is configured, for each group and simultaneously for each pixel of said group, to control one or a plurality of successive switchings to the conductive state of the transfer gate of said pixel at each first phase of charge transfer to the sense nodes of the pixels of said group.

According to an embodiment, the control circuit is configured, in the first operating mode further comprising, for each group, first phases of reading of the sense nodes of the pixels of said group, and, for each group, to keep in the non-conductive state each initialization transistor connected between the sense node of a pixel of said group and the sense node of a pixel of another one of said groups or the node of application of the initialization potential during each first phase of reading of the sense nodes of the pixels in the group.

According to an embodiment, the control circuit is configured, in the first operating mode, for each group and for each reading of a signal level of said group successively comprising a first phase of transfer of photogenerated charges to the sense nodes of the pixels in the group and a first phase of reading of the sense nodes of the pixels in the group, to keep in the non-conductive state each initialization transistor connected between the sense node of a pixel of said group and the sense node of a pixel of another one of said groups or the node of application of the initialization potential, from said first transfer phase to said first readout phase.

According to an embodiment, the control circuit is configured, in the first operating mode, for each group and for each reading of an initialization level of said group successively comprising a simultaneous initialization phase in all the pixels of said group and a first phase of reading of the sense nodes of the pixels in the group, to keep in the non-conductive state each initialization transistor connected between the sense node of a pixel of said group and the sense node of a pixel of another one of said groups or the node of application of the initialization potential, from the initialization phase to said first readout phase.

According to an embodiment, the control circuit is configured, for each simultaneous initialization phase in the pixels of two successive groups, to end the phase of initialization of the pixels of that of the two groups which is most distant from the node of application of the initialization potential by switching to the non-conductive state the initialization transistor of that of the pixels of said group which is closest to the node of application of the initialization potential, and then end the phase of initialization of the pixels of that of the two groups which is closest to the node of application of the initialization potential by switching to the non-conductive state the initialization transistor of that of the pixels of said group which is closest to the node of application of the initialization potential.

According to an embodiment, the control circuit is configured, in a second operating mode comprising second phases of transfer of photogenerated charges to the sense nodes of said N pixels, and for each of said N pixels, to keep in the non-conductive state each initialization transistor connected to the sense node of said pixel during each second phase of charge transfer to the sense node of said pixel.

According to an embodiment, the control circuit is configured, for each of said N pixels, to control a single switching to the conductive state of the transfer gate of said pixel at each second phase of charge transfer to the sense node of said pixel.

According to an embodiment, the control circuit is configured, for each of said N pixels, to control a plurality of switchings to the conductive state of the transfer gate of said pixel at each second phase of charge transfer to the sense node of said pixel.

According to an embodiment, the control circuit is configured, in the second operating mode further comprising second phases of reading of the sense nodes of said N pixels, and for each of said N pixels, to keep in the non-conductive state each initialization transistor connected to the sense node of said pixel during each second phase of reading of the sense node of said pixel.

According to an embodiment, the control circuit is configured, in the second operating mode, for each of said N pixels and for each reading of a signal level of said pixel successively comprising a second phase of transfer of photogenerated charges to the sense node of said pixel and a second phase of reading of the sense node of said pixel, to keep in the non-conductive state each initialization transistor connected to said sense node, from said second transfer phase to said second readout phase.

According to an embodiment, the control circuit is configured, in the second operating mode, for each of said N pixels and for each reading of a signal level of said pixel successively comprising a phase of initialization of the sense node of said pixel and second phase of reading of the sense node of said pixel, to keep in the non-conductive state each initialization transistor connected to said sense node, from said second transfer phase to said second readout phase.

According to an embodiment, the control circuit is configured, for each second simultaneous initialization phase in two successive pixels from among said N pixels, to end the second phase of initialization of that of two pixels which is most distant from the node of application of the initialization potential by switching to the non-conductive state the initialization transistor of said pixel, and then end the second phase of initialization of that of two pixels which is closest to the node of application of the initialization potential by switching to the non-conductive state the initialization transistor of said pixel.

BRIEF DESCRIPTION OF THE DRAWINGS

The foregoing features and advantages, as well as others, will be described in detail in the rest of the disclosure of specific embodiments given by way of illustration and not limitation with reference to the accompanying drawings, in which.

DETAILED DESCRIPTION OF ILLUSTRATIVE EMBODIMENTS

Figure 1:
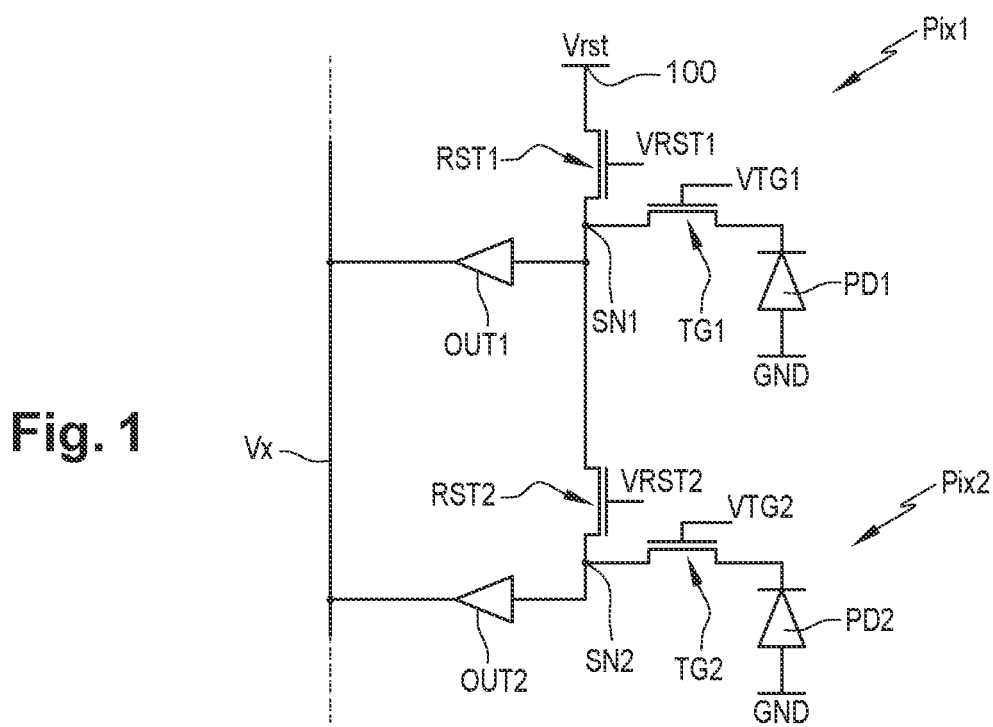
FIG. 1 schematically shows two pixels of a light sensor according to an embodiment.

Like features have been designated by like references in the various figures. In particular, the structural and/or functional features that are common among the various embodiments may have the same references and may dispose identical structural, dimensional and material properties.

For the sake of clarity, only the steps and elements that are useful for an understanding of the embodiments described herein have been illustrated and described in detail. In particular, the various known circuits or applications where a light sensor may be provided have not been detailed, the described embodiments and variants being compatible with these known circuits or applications.

Unless indicated otherwise, when reference is made to two elements connected together, this signifies a direct connection without any intermediate elements other than conductors, and when reference is made to two elements coupled together, this signifies that these two elements can be connected or they can be coupled via one or more other elements.

In the following disclosure, when reference is made to absolute positional qualifiers, such as the terms "front," "back," "top," "bottom," "left," "right," etc., or to relative positional qualifiers, such as the terms "above," "below," "upper," "lower," etc., or to qualifiers of orientation, such as "horizontal," "vertical," etc., reference is made, unless specified otherwise, to the orientation of the figures.

Unless specified otherwise, the expressions "around," "approximately," "substantially," and "in the order of" signify within 10%, and preferably within 5%.

The light sensor provided herein comprises pixels organized in an array of pixel rows and of pixel columns. In this sensor, successive pixels of a same column or, as a variant, of a same row, each comprise a photodiode, a sense node coupled to the photodiode, for example, by a transfer gate of the pixel, and a transistor having a first conduction terminal connected to the sense node of the pixel. Among these successive pixels, one of the pixels has the second conduction terminal of its transistor connected to an initialization potential, and each of the other pixels has the second conduction terminal of its transistor connected to the sense node of a neighboring pixel forming part of the successive pixels. As will be described in further detail hereafter, these transistors enable to initialize each of the sense nodes of the successive pixels. These transistors further enable the successive pixels to be selectively able to operate in a full resolution mode or in an extended dynamic range mode. In other words, in each of these successive pixels, one and the same transistor enables to initialize the sense node of the pixel and, selectively, to electrically couple the sense node of the pixel to the sense node of the neighboring pixel to which this transistor is connected.

Examples of embodiments and of variants will now be described for rolling shutter sensors, for global shutter sensors, and for indirect time of flight sensors, or iToF sensors.

FIG. 1 schematically shows pixels of a light sensor according to an embodiment.

Although the sensor is not entirely shown in FIG. 1, the sensor comprises an array of pixels organized in rows and in columns. Preferably, the columns are all identical and the rows are all identical. Further, the sensor comprises a pixel control circuit, not shown in FIG. 1.

FIG. 1 more particularly shows an association of N successive pixels Pixi of a same column of the sensor, with N an integer greater than or equal to 2 and i an integer index varying from 1 to N. In the example of FIG. 1, N is equal to 2.

Although this is not illustrated in FIG. 1, each column of the sensor may comprise exactly one association of N pixels Pixi connected together as illustrated in FIG. 1, or also a plurality of successive associations of N pixels Pixi in each of which the N pixels are connected to one another as illustrated in FIG. 1.

Each of the N pixels Pixi (Pix1 and Pix2 in FIG. 1) comprises a photodiode PDi (PD1 and PD2 in FIG. 1). Each of the N pixels Pixi further comprises a sense node SNi (SN1 and SN2 in FIG. 1). In each of the N pixels Pixi, node SNi is coupled to photodiode PDi.

More particularly, in the example of FIG. 1, each of the N pixels Pixi comprises a transfer gate TGi (TG1 and TG2 in FIG. 1) connected between the node SNi of the pixel and a terminal of the photodiode PDi of the pixel, for example its cathode in FIG. 1, the other terminal of photodiode PDi, for example, its anode in FIG. 1, being for example connected to a node of application of a reference potential, for example, ground GND. In each of the N pixels Pixi, gate TGi receives a control signal VTGi (VTG1 and VTG2 in FIG. 1), this control signal being, for example, delivered by the circuit for controlling the sensor pixels.

In the example of FIG. 1 where each of the N pixels Pixi comprises a transfer gate TGi, the photodiode PDi of each of the pixels Pixi is for example a pinned photodiode.

For example, each of the N pixels Pixi further comprises a circuit OUTi (OUT1 and OUT2 in FIG. 1) for reading of the node SNi of the pixel. In each of the N pixels Pixi, circuit OUTi is connected to node SNi.

As an example, when the N pixels belong to a same column as is the case in the example of FIG. 1, in each of the N pixels Pixi, circuit OUTi couples the pixel node SNi to a conductive line Vx common to all the pixels in the column, this line Vx having, for example, an end connected to a circuit for reading the pixels in the column.

Each of the N pixels Pixi further comprises a transistor RSTi (RST1 and RST2 in FIG. 1) connected to the node SNi of the pixel. More particularly, in each of the N pixels Pixi, transistor RSTi has a first conduction terminal connected to node SNi. In each of the N pixels, transistor RSTi is, for example, a MOS ("Metal Oxide Semiconductor") transistor.

One of the N pixels Pixi arranged at one end of the association of the N successive pixels Pixi in the column has its transistor RSTi which is connected between the node SNi of the pixel and a node 100 of application of an initialization potential Vrst. In the example of FIG. 1, pixel Pix1 has its transistor RST1 connected between node SN1 and node 100. More particularly, transistor RST1 has its second conduction terminal connected to node 100.

The other ones of the N pixels Pixi, that is, all the pixels Pixi except for that which has its transistor RSTi connected to node 100, each have their transistor RSTi which is connected between the node SNi of the pixel and the node SNi-1 of the neighboring pixel Pixi-1, or, in other words, each have the second conduction terminal of their transistor RSTi which is connected to the node SNi-1 of the neighboring pixel. In the example of FIG. 1, this means that pixel Pix2 has its transistor RST2 connected between nodes SN1 and SN2.

In other words, for each two successive pixels among the N pixels, that of the two pixels which is the most distant from the end of the association of the N successive pixels where the pixel Pixi having its transistor RSTi connected to node 100 is arranged, that is, that of the two successive pixels Pixi which is the most distant from node 100, has its transistor RSTi connected between the nodes SNi of these two pixels. In the example of FIG. 1, among the two successive pixels Pix1 and Pix2, pixel Pix2 is the most distant from node 100 and thus has its transistor RST2 connected between the nodes SN1 and SN2 of the two respective pixels Pix1 and Pix2.

As an example, the potential Vrst referenced to ground is positive, and each transistor RSTi has an N channel, has its first terminal which corresponds to its source, and has its second terminal which corresponds to its drain.

Figure 2:
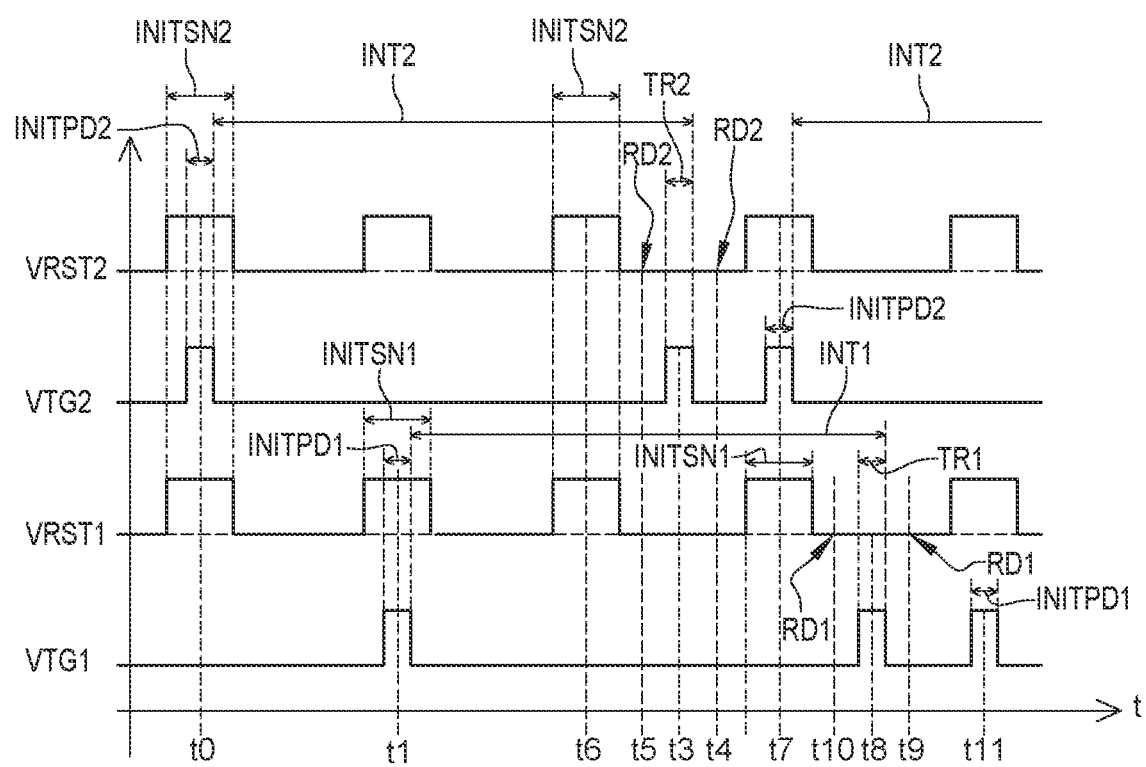
FIG. 2 shows timing diagrams illustrating an example of an operating mode of the pixels of FIG. 1.

FIG. 2 shows timing diagrams illustrating an example of an operating mode of the pixels Pix1 and Pix2 of FIG. 1. In this example, the sensor comprising pixels Pix1 and Pix2 operates in rolling shutter mode. Further, the operating mode of FIG. 2 corresponds to an operating mode called, for example, full resolution operating mode. Thus, in this operating mode, the transistors RST1 and RST2 of the N respective pixels Pix1 and Pix2 are not used to average or to sum charges of node SN1 with those of node SN2, but on the contrary to electrically isolate nodes SN1 and SN2 when charges are transferred to these nodes and when these nodes are read from.

In the example of FIG. 2, and more generally in a rolling shutter and full resolution operation, for each of the N pixels Pixi, at each phase INITSNi of initialization of the node SNi of pixel Pixi, the pixel control circuit is configured so that all the transistors RSTi which couple the node SNi of pixel Pixi to node 100 are simultaneously kept conductive.

In the example of FIG. 2, and more generally in a rolling shutter operation, according to an embodiment, the full resolution operating mode comprises phases TRi of transfer of photogenerated charges to the nodes SNi of the N pixels Pixi. The pixel control circuit is then configured, for each of the N pixels Pixi, to keep in the non-conductive state each transistor RSTi connected to the node SNi of pixel Pixi during each phase TRi of transfer of charges photogenerated in the photodiode PDi of pixel Pixi to the node SNi of this pixel Pixi.

In the example of FIG. 2, and more generally in a rolling shutter and full resolution operation, according to an embodiment, each phase TRi of transfer of charges photogenerated in the photodiode PDi of pixel Pixi to the node SNi of this pixel Pixi comprises a single charge transfer. According to an embodiment, when, in each of the N pixels Pixi, node SNi and photodiode PDi are coupled by a gate TGi as described in relation with FIG. 1 and each phase TRi comprises a single charge transfer, the pixel control circuit is configured, for each of the N pixels Pixi, to control a single setting to the conductive state of the gate TGi of the pixel per phase TRi implemented for this pixel Pixi, as illustrated by the example of FIG. 2.

In the example of FIG. 2 and, more generally in a rolling shutter and full resolution operation, according to an embodiment, the full resolution operation comprises phases of reading RDi from the nodes SNi of the N pixels. The pixel control circuit is then configured, for each of the N pixels Pixi, to keep in the non-conductive state each transistor RSTi connected to the node SNi of pixel Pixi during each phase RDi of reading of the node SNi of this pixel Pixi. When the sensor operates in rolling shutter and at full resolution, and, in each of pixels Pixi, node SNi and photodiode PDi are coupled by a gate TGi as described in relation with FIG. 1, gate TGi is preferably kept non-conductive during each phase RDi of reading of pixel Pixi.

In the example of FIG. 2, each transistor RSTi is in the conductive, respectively non-conductive, state when the corresponding signal VRSTi is in the high, respectively low, state and, further, each transfer gate TGi is conductive, respectively non-conductive, when the corresponding signal VTGi is in the high, respectively low, state.

At a time t0, a phase INITPD2 of initialization of the photodiode PD2 of pixel Pix2 is implemented to empty photodiode PD2 of the photogenerated charges which are present therein.

For this purpose, in this example where each pixel Pixi (FIG. 1) comprises no photodiode initialization transistor coupling its photodiode PDi to a photodiode initialization potential, phase INITPD2 comprises the setting to the conductive state of gate TG2 by means of a pulse of signal VTG2, during a phase INITSN2 of initialization of node SN2.

During this phase INITSN2, transistors RST2 and RST1 which couple node SN2 to node 100 are simultaneously kept in the conductive state, in this example by the high state of signals VRTS1 and VRST2. The setting to the conductive state of gate TG2 during this phase INITSN2 enables to initialize photodiode PD2.

The end of phase INITPD2, that is, the end of the corresponding pulse of signal VTG2 in this set, marks the beginning of a phase INT2 of integration by pixel Pix2.

At a next time t1, a phase INITPD1 of initialization of the photodiode PD1 of pixel Pix1 is implemented. For this purpose, in this example where each pixel Pixi (FIG. 1) comprises no photodiode initialization transistor coupling its photodiode PDi to a photodiode initialization potential, phase INITPD1 comprises the setting to the conductive state of gate TG1 by means of a pulse of signal VTG1, during a phase INITSN1 of initialization of node SN1.

More generally, in a rolling shutter and full resolution operating mode, for each pixel Pixi, each phase INITPDi of the photodiodes PDi of pixel Pixi is implemented during a corresponding phase INITSNi, by setting the gate TGi of pixel Pixi to the conductive state.

During this phase INITSN1, the transistor RST1 which couples node SN1 to node 100 is kept in the conductive state, in this example by the high state of signal VRST1. The setting to the conductive state of gate TG1 during this phase INITSN1 enables to initialize photodiode PD1. As an example, as illustrated in FIG. 2, during this phase INITSN1, transistor RST2 may also be in the conductive state, although this is not indispensable.

The end of phase INITPD1, that is, the end of the corresponding pulse of signal VTG1 in this set, marks the beginning of a phase INT1 of integration by pixel Pix1.

The end of integration period INT2 comprises, at a next time t3, a charge transfer phase TR2 marking the end of period INT2 and comprising a single charge transfer. In this example, this phase TR2 thus comprises a single setting to the conductive state of gate TG2, and, further, the transistor RST2 of pixel Pix2 which is the single initialization transistor RSTi connected to node SN2 is kept in the non-conductive state during this phase TR2.

After this phase TR2 of time t3, at a next time t4, node SN2 is read for a corresponding readout phase RD2, for example by means of circuit OUT2. The readout phase RD2 of time t3 corresponds to a phase of reading a signal level of node SN2, or, in other words, of a signal level of pixel Pix2.

In this example, the transistor RST2 of pixel Pix2 which is the single initialization transistor RSTi connected to node SN2 is kept in the non-conductive state during this phase RD2. Further, in this example, gate TG2 is kept in the non-conductive state during readout phase RD2.

To avoid modifying the state of node SN2 between the end of the previous phase TR2 and the phase of reading of node SN2 at time t3, the single transistor RSTi which is connected to the node SN2 of pixel Pix2, that is, transistor RST2 in this example, is kept non-conductive from the end of the transfer phase TR2 of time t2 to the beginning of the readout phase RD2 of time t3.

More generally, in a rolling shutter and full resolution operation, according to an embodiment, each reading of a signal level of a pixel Pixi comprises the succession of a transfer phase Tri and of a readout phase RDi, and the control circuit is configured to keep non-conductive each initialization transistor connected to the node SNi of pixel Pixi from the end of this phase TRi to the beginning of phase RDi.

Preferably, according to an embodiment, the sensor is configured to implement a correlated double sampling. In this case, for each phase INTi of integration in a corresponding pixel Pixi, in addition to a reading of a signal level of the node SNi of pixel Pixi, the sensor is configured to implement a phase RDi of reading of node SNi after an initialization phase INITSNi, to read an initialization level of node SNi, or, in other words, an initialization level of pixel Pixi.

As an example, a correlated double sampling is implemented in the example of FIG. 2. For example, for the integration phase INT2 ranging from the end of phase INITPD2 of time to the transfer phase TR2 of time t3, this correlated double sampling comprises a phase RD2 of reading of node SN2 at a time t5 before the transfer phase TR2 of time t3 and after an initialization phase INITSN2 implemented at a time t6.

The phase INITSN2 of time t6 comprises the keeping in the conductive state of the transistors RST2 and RST1 which couple node SN2 to node 100.

To avoid modifying the state of node SN2 between the end of phase INITSN2 of time t6 and readout phase RD2 at time t5, the single transistor RSTi which is connected to the node SN2 of pixel Pix2, that is, transistor RST2 in this example, is kept off from the end of the transfer phase INITSN2 of time t6 to the beginning of the readout phase RD2 of time t5. During this period, although this is not indispensable, transistor RST1 is also kept in the non-conductive state in this example.

More generally, in a rolling shutter and full resolution operation, according to an embodiment, each reading of an initialization level of a pixel Pixi comprises the succession of an initialization phase INITSNi and of a readout phase RDi, and the control circuit is configured to keep non-conductive each initialization transistor connected to the node SNi of pixel Pixi from the end of this phase INITSNi to the beginning of this phase RDi.

In this example, the two transistors RST1 and RST2 are kept non-conductive between the phase RD2 of time t5 and the beginning of the phase TR2 of time t3.

After the readout phase RD2 of time t4, a new phase INITPD2 is implemented at a time t7 to start a new integration phase INT2 at the end of this phase INITPD2.

Similarly to what has just been described for pixel Pix2, the end of the period INT1 of pixel Pix1 having started at the end of the phase INITPD1 of time ti is marked by a transfer phase TR1 at a time t8, subsequent to time t4, and, in this example, subsequent to time t7. During this phase TR1, the transistors RST1 and RST2 which are connected to node SN1 are kept in the non-conductive state and, in this example where phase TR1 comprises a single charge transfer, phase TR1 comprises a single setting to the conductive state of gate TG1.

After this phase TR1 of time t8, at a next time t9, node SN1 is read during a corresponding readout phase RD1, for example by means of circuit OUT1. The readout phase RD1 of time t8 corresponds to a phase of reading of a signal level of node SN1. In this example, the two transistors RST1 and RST2 which are connected to node SN1 are kept in the non-conductive state during phase RD1 of time t9. Further, the two transistors RST1 and RST2 which are connected to node SN1 are kept non-conductive between the end of the phase TR1 of time t8 and the phase of reading of node SN1 at time t9 to avoid modifying the state of node SN1.

In the example of FIG. 2, a correlated double sampling is implemented, this correlated double sampling comprising a phase of reading RD1 of the initialization level of node SN1, for example, at a time t10 before the transfer phase TR1 of time t8 and after an initialization phase INITSN1, for example implemented at time t7. The phase INITSN1 of time t7 comprises the keeping in the conductive state of transistors RST2 and RST1, and the readout phase RD1 of time t10 comprises the keeping in the non-conductive state of transistors RST2 and RST1. Between the end of the phase INITSN1 of time ty and readout phase RD1 at time t10, the two transistors RST1 and RST2 connected to node SN1 are kept in the non-conductive state to avoid modifying the state of node SN1.

After the readout phase RD1 of time t9, a new phase INITPD1 is implemented at a time t11, to start a new integration phase INT1 at the end of this phase INITPD1.

Figure 3:
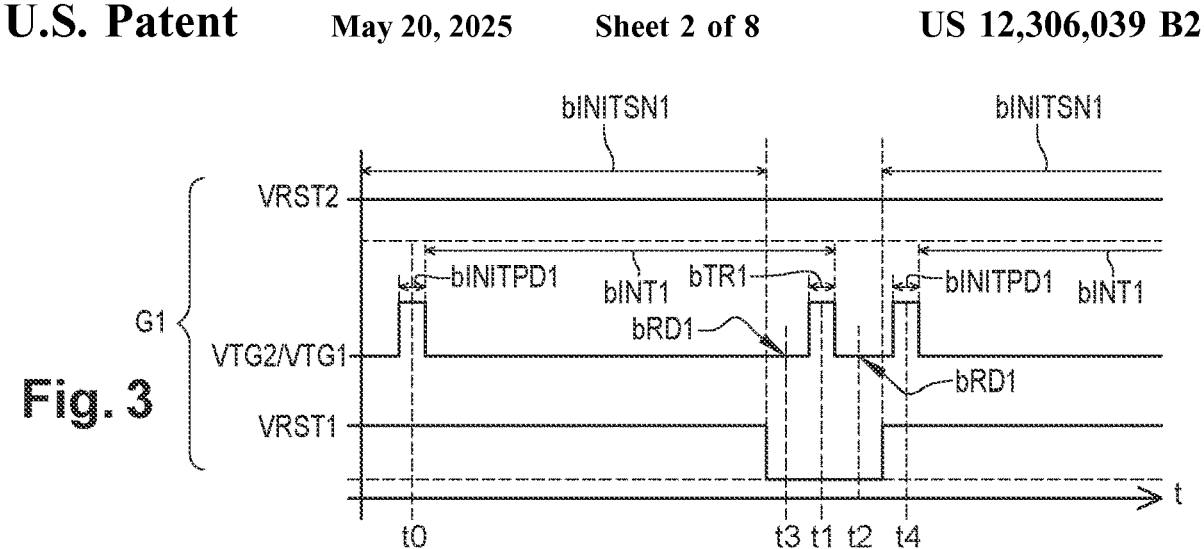
FIG. 3 shows timing diagrams illustrating an example of another operating mode of the pixels of FIG. 1.

FIG. 3 shows timing diagrams illustrating an example of another operating mode of the pixels Pix1 and Pix2 of FIG. 1. In this example, the sensor comprising pixels Pix1 and Pix2 operates in rolling shutter mode. Further, the operating mode of FIG. 2 corresponds to an operating mode called, for example, extended dynamic range operating mode. In this operating mode, the transistors RST1 and RST2 of the N respective pixels Pixi and Pix2 are used to average or sum charges of node SN1 with those of node SN2 when charges are transferred to these nodes and when these nodes are read from.

More generally, in an extended dynamic range operation, the N pixels Pixi are distributed in K groups Gj, with K an integer greater than or equal to 1 and j an index ranging from 1 to K. Each of the K groups comprises M successive pixels among the N pixels with M an integer greater than or equal to 2. Each of the N pixels belongs to a single group Gj. In the example of FIG. 3, N is equal to 2 (FIG. 1), K is equal to 1, and M is equal to 2, or, in other words, the two pixels Pix1 and Pix2 (FIG. 1) belong to one and the same group G1.

In the example of FIG. 3, and more generally in a rolling shutter and extended dynamic range operation, for each of the N pixels Pixi, at each phase INITSNi of initialization of the node SNi of pixel Pixi, the pixel control circuit is configured so that all the transistors RSTi which couple the node SNi of pixel Pixi to node 100 are kept in the conductive state. Thus, for each group Gj, and each phase bINITSNj of initialization of the nodes SNi of the pixels Pixi in the group, the pixel control circuit is configured so that all the transistors RSTi which couple the node SNi of each pixel Pixi of group Gj to node 100 are kept in the conductive state.

According to an embodiment, as illustrated in the example of FIG. 3, in a rolling shutter and extended dynamic range operation, in each group Gj, the transistor RSTi connected between the sense nodes SNi of each two pixels Pixi of group Gj is kept conductive by the control circuit. In this example of FIG. 3, this means that transistor RST2 is kept conductive.

In the example of FIG. 3, and, more generally, in a rolling shutter and extended dynamic range operation, according to an embodiment the extended dynamic range operating mode comprises, for each group Gj, phases bTRj of transfer of photogenerated charges to the nodes SNi of the pixels of group Gj. In this case, the pixel control circuit is configured, for each group Gj, to keep in the non-conductive state each transistor RSTi connected between a node SNi of a pixel in the group and, either the node SNi of another pixel in the group, or node 100, during each phase bTRj of transfer of photogenerated charges to the nodes SNi of the pixels in the group.

Thus, in the example of FIG. 3, during each phase bTR1 of transfer of photogenerated charges to the nodes SN1 and SN2 of the pixels Pix1 and Pix2 of group G1, the transistor RST1 connected between nodes SN1 and 100 is kept in the non-conductive state.

In the example of FIG. 3, and, more generally in a rolling shutter and extended dynamic range operation, according to an embodiment, each phase bTRi comprises a single charge transfer from the photodiodes PDi of the pixels Pixi of group Gj to the nodes SNi of the pixels Pixi of group Gj. According to an embodiment where, in each of the N pixels Pixi, node SNi and photodiode PDi are coupled by a gate TGi as described in relation with FIG. 1 and each phase bTRi comprises a single charge transfer, the pixel control circuit is configured, for each of the M pixels Pixi of group Gj, to control a single setting to the conductive state of the transistor TGi of the pixel per phase bTRj implemented for this pixel Pixi, as illustrated by the example of FIG. 3.

In the example of FIG. 3, and, more generally, in a rolling shutter operation, according to an embodiment, the extended dynamic range operating mode comprises, for each group Gj, phases bRDj of reading of the nodes SNi of the pixels in the group. The pixel control circuit is then configured, for each group Gj, to keep in the non-conductive state each transistor RSTi connected between the sense node of a pixel in the group and either the sense node of a pixel of another group Gj, or node 100, during each phase bRDj of reading of the sense nodes of the pixels in the group. When the sensor operations in rolling shutter and extended dynamic range, and, in each of pixels Pixi, node SNi and photodiode PDi are coupled by a gate TGi as described in relation with FIG. 1, for each group Gj, the gate TGi of each pixel of group Gj is, preferably, kept non-conductive during each phase bRDj of reading of this group.

In the example of FIG. 3, each transistor RSTi is in the conductive, respectively non-conductive, state, when the corresponding signal VRSTi is in the high, respectively low, state and, further, each transfer gate TGi is conductive, respectively non-conductive, when the corresponding signal VTGi is in the high, respectively low, state.

In FIG. 3, at a time to, a phase bINITPD1 of initialization of the photodiodes PD1 and PD2 of the pixels Pix1 and Pix2 of group G1 is implemented.

For this purpose, in this example where each pixel Pixi (FIG. 1) comprises no photodiode initialization transistor coupling its photodiode PDi to a photodiode initialization potential, phase bINITPD1 comprises the setting to the conductive state of gates TG1 and TG2, during a phase bINITSN1 of initialization of nodes SN1 and SN2.

During this phase bINITSN1, the transistors RST2 and RST1 which couple node SN2 to node 100 are simultaneously kept in the conductive state. The setting to the conductive state, preferably simultaneously, of gates TG1 and TG2, in this example by a pulse in the high state of each of signals VTG1 and VTG2, during this phase bINITSN1 enables to initialize photodiodes PD1 and PD2.

More generally, in a rolling shutter and extended dynamic range operating mode, for each group Gj, each phase bINITPDj of the photodiodes PDi of the pixels Pixi of group Gj is implemented during a corresponding phase bINITSNj, by setting the gate TGi of the pixels of group Gj to the conductive state.

The end of phase bINITPD1, that is, the end of the corresponding pulses of signals VTG1 and VTG2 in this example, marks the beginning of a phase bINT1 of integration by the pixels Pix1 and Pix2 of group G1.

The end of integration phase bINT1 comprises, at a next time t1, a charge transfer phase bTR1 marking the end of period bINT1 and comprising, for each pixel Pix1, Pix2 of group G1, a single charge transfer from the photodiode of the pixel to the sense node of the pixel. In this example, this phase bTR1 thus comprises a single setting to the conductive state, for example, simultaneous, of gate TG1 and of gate TG2. Further, during this phase bTR1, since the transistor RST1 of the pixel Pix1 of group G1 is connected to node 100, it is kept in the non-conductive state during this phase bTR1.

After this phase bTR1 of time t1, at a next time t2, nodes SN1 and SN2 are read during a corresponding readout phase bRD1. During this readout phase bRD1, the transistor RST1 of pixel Pix1 which is connected to node 100 is kept in the non-conductive state. Further, since transistor RST2 is in the conductive state, nodes SN1 and SN2 are electrically coupled, and the reading of these nodes may be implemented by circuit OUT1 and/or circuit OUT2.

The readout phase bRD1 of time t3 corresponds to a phase of reading of a signal level of nodes SN1 and SN2, or in other words, of a signal level of group G1.

Preferably, gates TG1 and TG2 are kept in the non-conductive state during readout phase bRD1.

To avoid modifying the state of nodes SN1 and SN2 between the end of the previous phase bTR1 and the readout phase bRD1 of time t3, the transistor RSTi of pixel Pixi which is connected to node 100 in group G1, that is, transistor RST1 in this example, is kept non-conductive from the end of phase bTR1 to the beginning of the phase bRD1 of time t3.

More generally, in a rolling shutter and extended dynamic range operation, according to an embodiment, each reading of a signal level of a group Gj comprises the succession of a transfer phase bTRj and of a readout phase RDj, and the control circuit is configured to keep non-conductive each initialization transistor connected between the node SNi of a pixel Pixi of said group Gj and either the node SNi of a pixel Pixi of another group Gj, or node 100, from the end of this phase bTRj to the beginning of this phase bRDj.

Preferably, according to an embodiment, the sensor is configured to implement a correlated double sampling. In this case, for each phase bINTj of integration by a corresponding group Gj of pixels Pixi, in addition to a phase bRDj of reading of a signal level of the nodes SNi of the pixels Pixi of group Gj, the sensor is configured to implement a phase bRDi of reading of these nodes SNi after an initialization phase bINITSNi, to read an initialization level of these nodes SNi, or, in other words, an initialization level of group Gj.

As an example, a correlated double sampling is implemented in the example of FIG. 3. For example, for the integration phase bINT1 ranging from the end of the phase bINITPD1 of time to the transfer phase bTR1 of time t1, this correlated double sampling comprises a phase bRD1 of reading of nodes SN1 and SN3 at a time t3 before the transfer phase bTR1 of time t1 and after the end of an initialization phase bINITSN1, for example, the end of phase bINITSN1 comprising phase bINITPD1.

To avoid modifying the state of nodes SN1 and SN2 between this end of this phase bINITSN1 and readout phase bRD1 at time t3, transistor RST1, which is the single transistor of group G1 connected to node 100 or to the node SNi of a pixel Pixi of another group, is kept non-conductive from the end of transfer phase bINITSN1 to the beginning of the readout phase bRD1 of time t3.

More generally, in a rolling shutter and extended dynamic range operation, according to an embodiment, each reading of an initialization level of a group Gj comprises the succession of a phase bINITSNj and of a readout phase RDj, and the control circuit is configured to keep non-conductive each initialization transistor connected between the node SNi of a pixel Pixi of said group Gj and either the node SNi of a pixel Pixi of another group Gj, or node 100, from the end of this phase bNIITSNj to the beginning of this phase bRDj.

In this example, transistor RST1 is also kept non-conductive between the phase bRD1 of time t3 and the beginning of the phase bTR1 of time t1.

After, the readout phase bRD1 of time t2, a new phase bINITPD1 is implemented at a time t4 to start a new integration phase bINT1. Thus, a new initialization phase bINITSN1 starts after time t2 and the new phase bINITPD1 is implemented during this new initialization phase bINITSN1.

The case of N equal to 2 (FIG. 1) has been described hereinabove for a sensor operating in rolling shutter selectively in full resolution mode (FIG. 2) or in extended dynamic range mode (FIG. 3).

What has been previously indicated applies to case with N different from 2.

Figure 4:
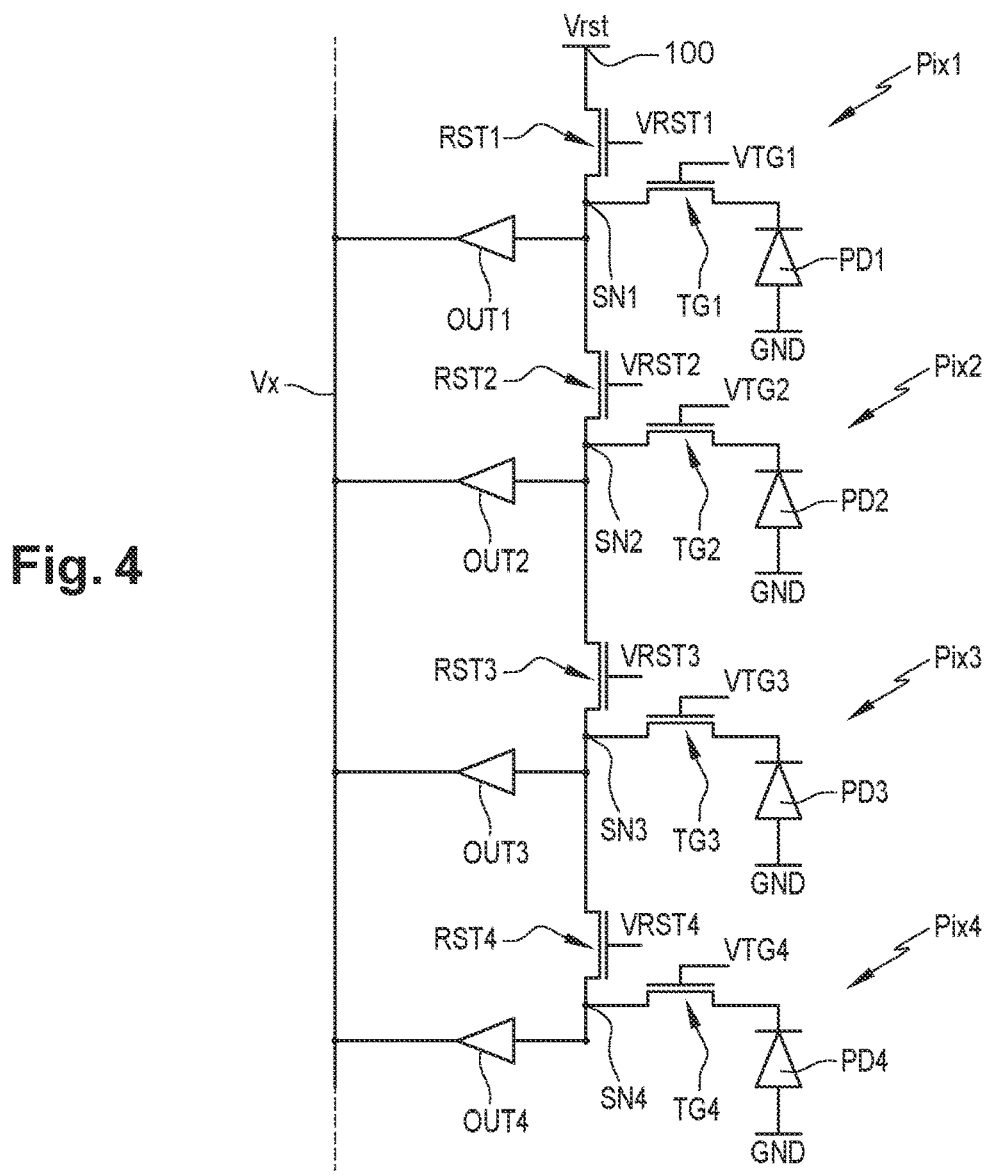
FIG. 4 schematically shows four pixels of a light sensor according to an embodiment.

FIG. 4 schematically shows pixels of a light sensor according to an embodiment described in relation with FIG. 1, with the difference that, in the example of FIG. 4, N is equal to 4. In other words, FIG. 4 illustrates an association of N successive pixels Pixi of a same column of the sensor, in an example where N is equal to 4.

Only the differences between the example of FIG. 1 and that of FIG. 4 are here highlighted and, unless otherwise indicated, all that has been described in relation with FIG. 1 applies to FIG. 4.

Thus, as compared with FIG. 1, the N pixels of FIG. 4 further comprise a pixel Pix3 and a pixel Pix4.

Similarly to pixels Pix1 and Pix2, pixel Pix3, respectively Pix4, comprises a photodiode PD3, respectively PD4, a sense node SN3, respectively SN4, coupled to photodiode PD3, respectively PD4, in this example by a transfer gate TG3, respectively TG4, receiving a control signal VTG3, respectively VTG4.

Signals VTG3 and VTG4 are for example delivered by the sensor pixel control circuit, which circuit is not shown in FIG. 4.

For example, pixel Pix3, respectively Pix4, further comprises a circuit OUT3, respectively OUT4, for reading of node SN3, respectively SN4.

Pixel Pix3, respectively Pix4, further comprises a transistor RST3, respectively RST4 in FIG. 1, connected to node SN3, respectively SN4.

As in FIG. 1, the transistor RST1 of pixel Pixi is connected to node 100. Thus, pixel Pix3 has its transistor RST3 connected between nodes SN3 and SN2, and pixel Pix4 has its transistor RST4 connected between nodes SN4 and SN3.

Figure 5:
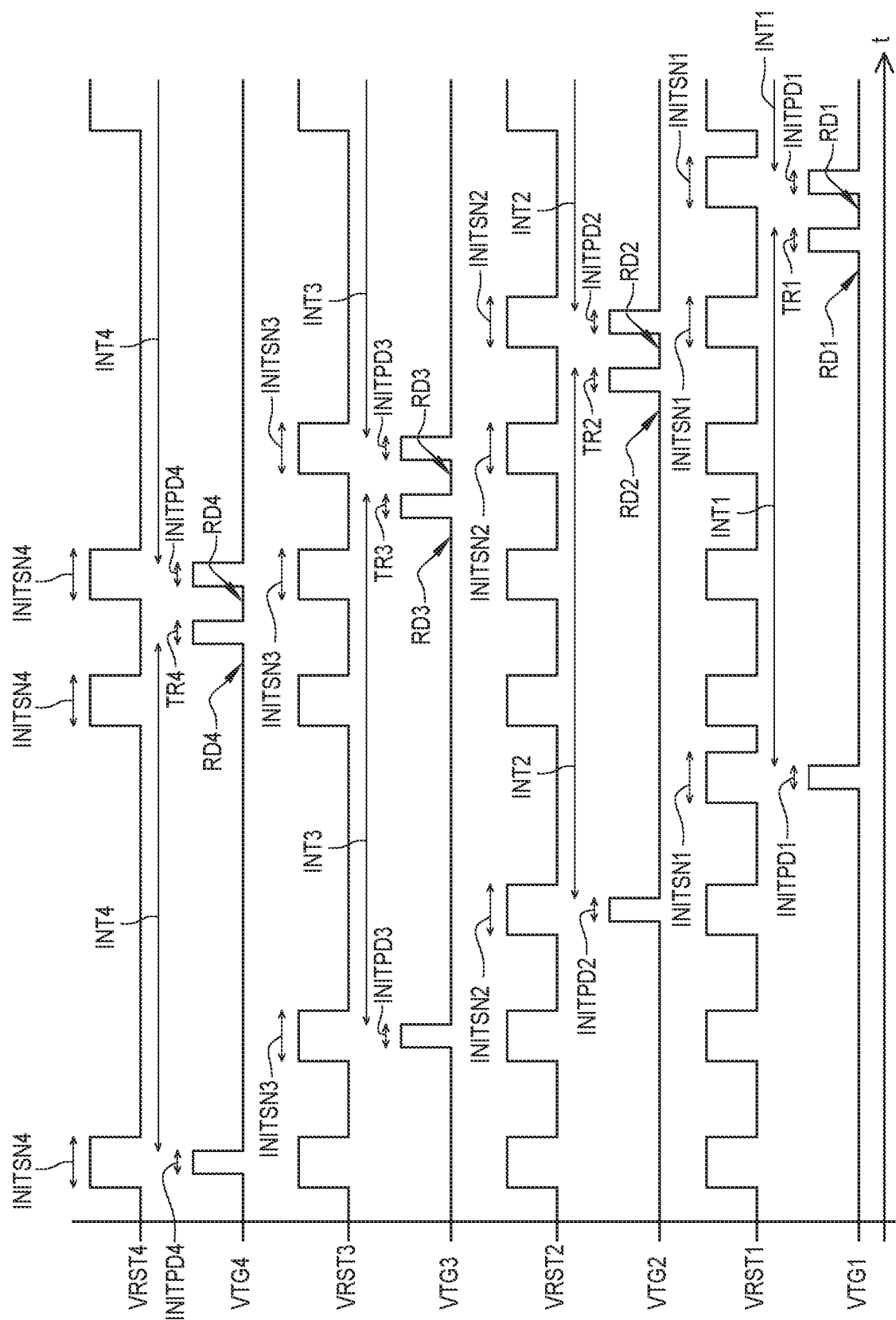
FIG. 5 shows timing diagrams illustrating an example of an operating mode of the pixels of FIG. 4.

FIG. 5 shows timing diagrams illustrating an example of an operating mode of the pixels Pix1, Pix2, Pix3, and Pix4 of FIG. 4.

More particularly, FIG. 5 illustrates, like FIG. 2, an example of operation in rolling shutter and full resolution mode, with the difference that, in FIG. 5, N is equal to 4. In other words, FIG. 5 illustrates what has been described for N equal to 2 in relation with FIG. 2, when this is adapted to the case of N equal to 4. Thus, unless indicated otherwise, all that has been described in relation with FIG. 2 applies to FIG. 5.

In this example, for each pixel Pixi, the sensor successively implements: a phase INITPDi of initialization of the photodiode PDi of the pixel, during a phase INITSNi of initialization of the node SNi of this pixel; an integration phase INTi starting at the end of phase INITPDi; a charge transfer phase TRi implemented at the end of integration INTi; a readout phase RDi implemented after this transfer phase TRi, to read a signal level of node SNi; and after this phase RDi of reading of the signal level of node SNi, a repeating of the above phases.

In this example, each reading of a signal level of a pixel Pixi comprises the succession of a transfer phase TRi and of a readout phase RDi, and the control circuit is configured to keep non-conductive each initialization transistor connected to the node SNi of pixel Pixi from the end of this phase TRi to the beginning of phase RDi.

Further, in this example, a correlated double sampling is implemented. Thus, for each phase INTi of integration of each pixel Pixi, there is a second readout phase RDi to read an initialization level of the node SNi of pixel Pixi. This second phase RDi is implemented after an initialization phase INITSNi of node SNi of this pixel, and, in the example of FIG. 4, before the transfer phase TRi marking the end of integration phase INTi.

In this example, each reading of an initialization level of a pixel Pixi comprises the succession of an initialization phase INITSNi and of a readout phase RDi, and the control circuit is configured to keep non-conductive each initialization transistor connected to the node SNi of pixel Pixi from the end of this phase INITSNi to the beginning of this phase RDi.

In the example of FIG. 5, each integration phase INT4 starts before a phase INT3, itself starting before a phase INT2 which starts before a phase INT1.

In the example of FIG. 5, as in that of FIG. 2, each transistor RSTi is in the conductive, respectively non-conductive, state when the corresponding signal VRSTi is in the high, respectively low, state and, further, each transfer gate TGi is conductive, respectively non-conductive, when the corresponding signal VTGi is in the high, respectively low, state.

In the example of FIG. 5, for pixel Pix4:
during each phase INITSN4, the transistors RST1, RTS2, RST3, and RST4 which couple node SN4 to node 100 are simultaneously kept in the conductive state;
during each phase INITPD4, while a corresponding phase INITSN4 is being implemented, gate TG4 is set to the conductive state;
during each phase TR4, transistor RST4 is kept non-conductive;
in this example, during each phase TR4, a single charge transfer is implemented by means of a single setting to the conductive state of gate TG4;
during each phase RD4, transistor RST4 is kept non-conductive;
between each phase TR4 and the next phase RD4 where signal level SN4 is read, transistor RST4 is kept non-conductive;

from the end of each phase INITSN4 preceding a corresponding phase of reading of an initialization level of node SN4, to the beginning of this phase RD4, transistor RST4 is kept non-conductive; and in this example, between each phase RD4 of reading of an initialization level of node SN4 and the next phase TR4, transistor RST4 is kept non-conductive.

Similarly for pixel Pix3, as illustrated in FIG. 5:

during each phase INITSN3, the transistors RST1, RTS2, and RST3 which couple node SN3 to node 100 are simultaneously kept in the conductive state;

during each phase INITPD3, while a phase INITSN3 is being implemented, gate TG3 is set to the conductive state;

during each phase TR3, transistors RST3 and RST4 are kept non-conductive;

in this example, during each phase TR3, a single charge transfer is implemented by means of a single setting to the conductive state of gate TG3;

during each phase RD3, transistors RST3 and RST4 are kept non-conductive;

between each phase TR3 and the next phase RD3 where signal level SN3 is read, transistors RST3 and RST4 are kept non-conductive;

from the end of each phase INITSN3 preceding a corresponding phase RD3 of reading of an initialization level of node SN3, to the beginning of this phase RD3, transistors RST3 and RST4 are kept non-conductive; and in this example, between each phase RD3 of reading of an initialization level of node SN3 and the next phase TR3, transistors RST3 and RST4 are kept non-conductive.

Similarly, for pixel Pix2, as illustrated in FIG. 5:

during each phase INITSN2, the transistors RST1 and RTS2 which couple node SN2 to node 100 are simultaneously kept in the conductive state;

during each phase INITPD2, while a phase INITSN2 is being implemented, gate TG2 is set to the conductive state;

during each phase TR2, transistors RST2 and RST3 are kept non-conductive;

in this example, during each phase TR2, a single charge transfer is implemented by means of a single setting to the conductive state of gate TG2;

during each phase RD2, transistors RST2 and RST3 are kept non-conductive;

between each phase TR2 and the next phase RD2 where signal level SN2 is read, transistors RST2 and RST3 are kept non-conductive;

from the end of each phase INITSN2 preceding a corresponding phase RD2 of reading of an initialization level of node SN2, to the beginning of this phase RD2, transistors RST2 and RST3 are kept non-conductive; and in this example, between each phase RD2 of reading of an initialization level of node SN2 and the next phase TR2, transistors RST2 and RST3 are kept non-conductive.

Similarly for pixel Pix1, as illustrated in FIG. 5:

during each phase INITSN1, the transistor RST1 which couples node SN1 to node 100 is kept in the conductive state;

during each phase INITPD1, while a phase INITSN1 is being implemented, gate TG1 is set to the conductive state;

during each phase TR1, transistors RST1 and RST2 are kept non-conductive;

in this example, during each phase TR1, a single charge transfer is implemented by means of a single setting to the conductive state of gate TG1;

during each phase RD1, transistors RST1 and RST2 are kept non-conductive;

between each phase TR1 and the next phase RD1 where signal level SN1 is read, transistors RST1 and RST2 are kept non-conductive;

from the end of each phase INITSN1 preceding a corresponding phase RD1 of reading of an initialization level of node SN1, to the beginning of this phase RD1, transistors RST1 and RST2 are kept non-conductive; and in this example, between each phase RD1 of reading of an initialization level of node SN1 and the next phase TR1, transistors RST1 and RST2 in this example, are kept non-conductive.

Figure 6:
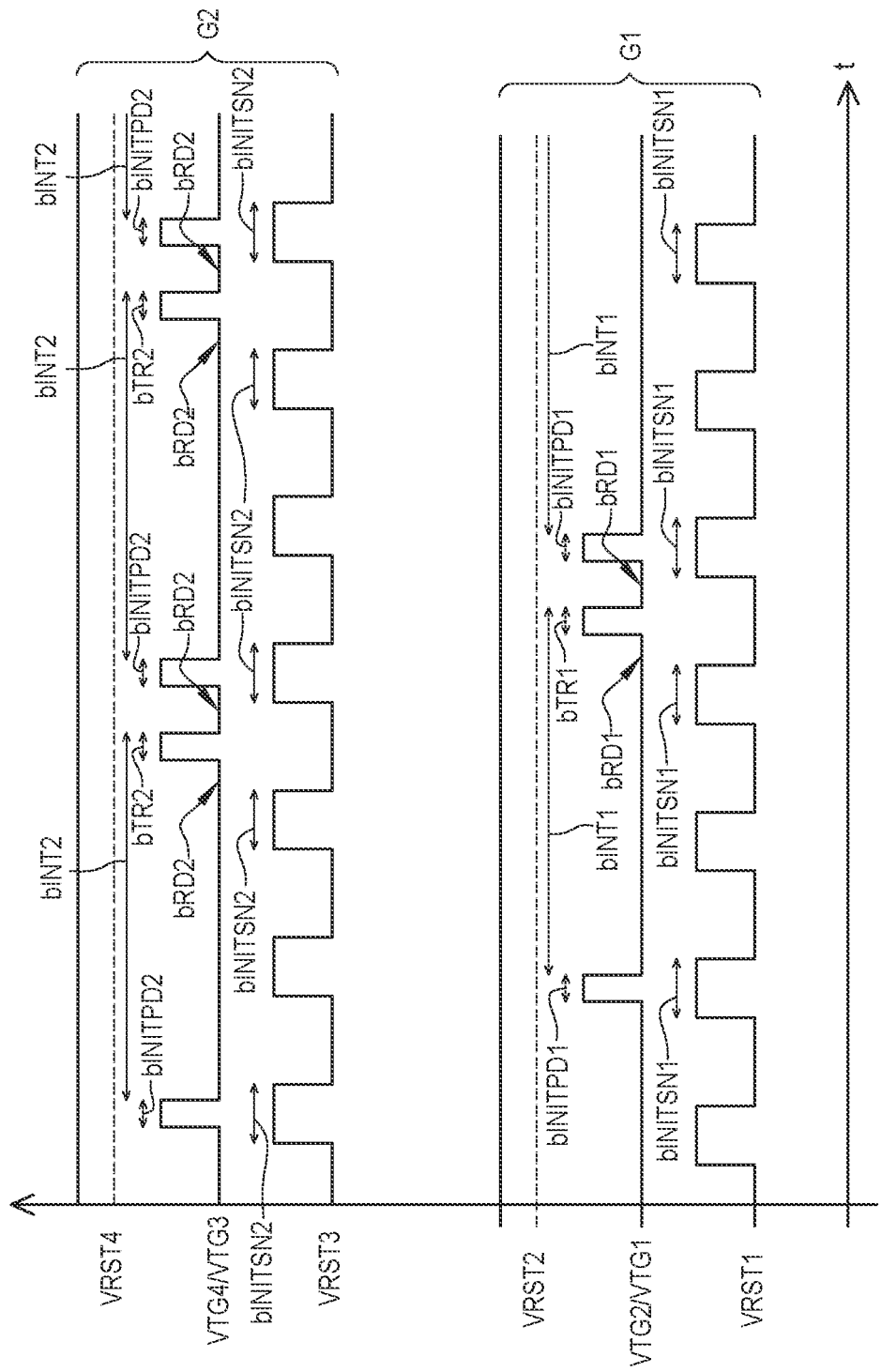
FIG. 6 shows timing diagrams illustrating an example of another operating mode of the pixels of FIG. 4.

FIG. 6 shows timing diagrams illustrating an example of another operating mode of the pixels Pix1, Pix2, Pix3, and Pix4 of FIG. 4.

More particularly, FIG. 6 illustrates, like FIG. 3, an example of operation in rolling shutter and extended dynamic range mode, with the difference that, in FIG. 6, N is equal to 4, K is equal to 2, and M is thus equal to 2. In other words, FIG. 6 illustrates what has been described for N equal to 2 in relation with FIG. 3, when this is adapted to the case of N equal to 4 with two groups G1 and G2 of 2 pixels. Thus, unless indicated otherwise, all that has been described in relation with FIG. 3 applies to FIG. 6.

In this example, group G1 comprises the successive pixels Pixi and Pix2, and group G2 comprises the successive pixels Pix3 and Pix4. Thus, resuming what has already been indicated in relation with FIG. 3, that is, in each group Gj, each transistor RSTi connecting the nodes SNi of two pixels Pixi in the group is kept conductive, and applying it to the example of FIG. 6, then transistors RST2 and RST4 are kept conductive.

In this example, for each group Gj, the sensor successively implements:

a phase bINITPDj of initialization of the photodiodes PDi of the pixels Pixi in this group, during a phase bINITSNj of initialization of nodes SNi of the pixels Pixi in this group;

an integration phase bINTj starting at the end of phase bINITPDj;

a phase bTRj of transfer of the charges photogenerated in the photodiodes PDi of the pixels Pixi of group Gj to the nodes SNi of these pixels implemented at the end of integration bINTj;

a first phase bRDj of reading of the nodes SNi of the pixels Pixi of group Gj implemented after this transfer phase bTRj, to read a signal level of these nodes SNj; and after this phase RDj of reading of the signal level of the nodes SNi of the pixels of group Gj, a repeating of the above phases.

In this example, each reading of a signal level of a group Gj comprises the succession of a transfer phase bTRj and of a readout phase RDj, and the control circuit is configured to keep non-conductive each initialization transistor connected between the node SNi of a pixel Pixi of said group Gj and either the node SNi of a pixel Pixi of another group Gj, or node 100, from the end of this phase bTRj to the beginning of this phase bRDj.

Further, in this example, a correlated double sampling is implemented. Thus, for each integration phase bINTj of each group Gj, there is a second readout phase bRDj to read an initialization level of the nodes SNi of the pixels Pixi in the group. This second phase bRDj is implemented after a corresponding initialization bINITSNj, and, in the example of FIG. 6, before the transfer phase bTRj marking the end of integration phase bINTj.

In this example, each reading of an initialization level of a group Gj comprises the succession of a phase bINITSNj and of a readout phase RDj, and the control circuit is configured to keep non-conductive each initialization transistor connected between the node SNi of a pixel Pixi of said group Gj and either the node SNi of a pixel Pixi of another group Gj, or node 100, from the end of this phase bNIITSNj to the beginning of this phase bRDj.

In the example of FIG. 6, each integration phase bINT2 starts before a phase bINT1.

In the example of FIG. 6, as in that of FIG. 3, each transistor RSTi is in the conductive, respectively non-conductive, state when the corresponding signal VRSTi is at the high, respectively low, state, and, further, each transfer gate TGi is conductive, respectively non-conductive, when the corresponding signal VTGi is in the high, respectively low, state.

In the example of FIG. 6, for group G2:
- during each phase bINITSN2, the transistors RST1, RTS2, RST3, and RST4 which couple nodes SN3 and SN4 to node 100 are simultaneously kept in the conductive state;
- during each phase bINITPD2, while a phase bINITSN2 is being implemented, gates TG3 and TG4 are set to the conductive state;
- during each phase bTR2, the transistor RST3 which is connected between the node SN3 of the pixel Pix3 of group G2 and the node SN2 of the pixel Pix2 is kept non-conductive;
- in this example, during each phase bTR2, a single charge transfer is implemented by means of a single setting to the conductive state, preferably simultaneous, of each of the gates TG3 and TG4 of the pixels Pix3 and Pix4 of group G2;
- during each phase bRD2, the transistor RST3 which is connected between the node SN3 of the pixel Pix3 of group G2 and the node SN2 of the pixel Pix2 of group Gi is kept non-conductive;
- between each phase bTR2 and the next phase bRD2 where the signal level of nodes SN3 and SN4 is read, the transistor RST3 which is connected between the node Pix3 of group G2 and the node SN2 of the pixel Pix2 of group G1 is kept non-conductive;
- from the end of each phase bINITSN2 preceding a corresponding phase bRD2 of reading of an initialization level of the nodes SN3 and SN4 of the pixels Pix3 and Pix4 in the group, until the beginning of this phase bRD2, the transistor RST3 which is connected between the node SN3 of the pixel Pix3 of group G2 and the node SN2 of the pixel Pix2 of group G1 is kept non-conductive; and
- in this example, between each phase bRD2 of reading of an initialization level of nodes SN3 and SN4 and the next phase bTR2, the transistor RST3 which is connected between the node SN3 of the pixel Pix3 of group G2 and the node SN2 of the pixel Pix2 of group G1 is kept non-conductive.

Similarly, as illustrated in FIG. 6 for group G1:
- during each phase bINITSN1, the transistors RST1 and RTS2 which couple nodes SN2 and SN1 to node 100 are simultaneously kept in the conductive state;
- during each phase bINITPD1, while a phase bINITSN1 is being implemented, gates TG1 and TG2 are set to the conductive state, preferably simultaneously;
- during each phase bTR1, the transistor RST1 which is connected between the node SN1 of the pixel Pix1 of group G1 and node 100, and the transistor RST3 which is connected between the node SN2 of the pixel Pix2 of group G1 and the node SN3 of the pixel Pix3 of the other group G2 are kept non-conductive;
- in this example, during each phase bTR1, a single charge transfer is implemented by means of a single setting to the conductive state, preferably simultaneous, of each of the gates TG2 and TG1 of the pixels Pix2 and Pixi of group G1;
- during each phase bRD1, the transistor RST1 which is connected between the node SN1 of the pixel Pix1 of group G1 and node 100, and the transistor RST3 which is connected between the node SN2 of the pixel Pix2 of group G1 and the node SN3 of the pixel Pix3 of the other group G2 are kept non-conductive;
- between each phase bTR2 and the next phase bRD2 where the signal level of nodes SN3 and SN4 is read, the transistor RST1 which is connected between the node SN1 of the pixel Pix1 of group G1 and node 100, and the transistor RST3 which is connected between the node SN2 of the pixel Pix2 of group G1 and the node SN3 of the pixel Pix3 of the other group G2 are kept non-conductive;
- from the end of each phase bINITSN1 preceding a corresponding phase of reading of an initialization level of the nodes SN2 and SN1 of the pixels Pix2 and Pixi in group G1, until the beginning of this phase bRD1, the transistor RST1 which is connected between the node SN1 of the pixel Pix1 of group G1 and node 100, and the transistor RST3 which is connected between the node SN2 of the pixel Pix2 of group G1 and the node SN3 of the pixel Pix3 of the other group G2 are kept non-conductive; and
- in this example, between each phase bRD1 of reading of an initialization level of nodes SN1 and SN2 and the next phase bTR1, the transistor RST1 which is connected between the node SN1 of pixel Pix1 of group G1 and node 100, and the transistor RST3 which is connected between the node SN2 of the pixel Pix2 of group G1 and the node SN3 of the pixel Pix3 of the other group G2 are kept non-conductive.

Figure 7:
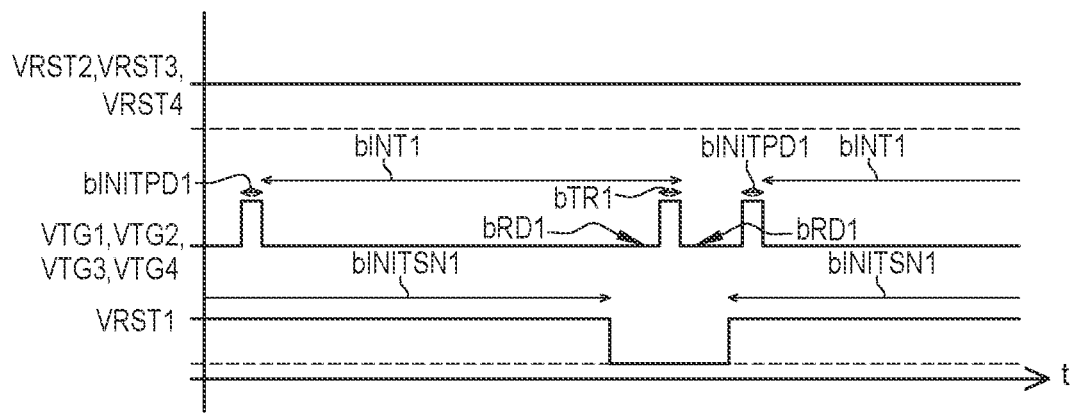
FIG. 7 shows timing diagrams illustrating another example of the operating mode of FIG. 6.

FIG. 7 shows timing diagrams illustrating another example of the operating mode described in relation with FIG. 6.

More particularly, FIG. 7 illustrates, like FIG. 6, an example of rolling shutter and extended dynamic range operation, with the difference that, in FIG. 7, N is equal to 4, K is equal to 1, and M is thus equal to 4. In other words, FIG. 7 illustrates what has been described for N equal to 4 in relation with FIG. 6, when this is adapted to the case of a single group G1 of 4 pixels. Thus, unless indicated otherwise, all that has been described in relation with FIG. 6 applies to FIG. 7.

In this example, resuming what has already been indicated in relation with FIGS. 3 and 6, that is, in each group Gj, each transistor RSTi connecting the nodes SNi of two pixels Pixi in the group is kept conductive, and applying it to the example of FIG. 7, then transistors RST2, RST3, and RST4 are kept conductive.

In this example, each reading of a signal level of a group Gj comprises the succession of a transfer phase bTRj and of a readout phase RDj, and the control circuit is configured to keep non-conductive each initialization transistor connected between the node SNi of a pixel Pixi of said group Gj and either the node SNi of a pixel Pixi of another group Gj, or node 100, from the end of this phase bTRj to the beginning of this phase bRDj.

Further, in this example, a correlated double sampling is implemented. Thus, for each phase bINTj of integration of each group Gj, in addition to a first readout phase bRDj to read a signal level of the nodes SNi of the pixels Pixi in the group, there is a second readout phase bRDj to read an initialization level of the nodes SNi of the pixels Pixi in the group. This second phase bRDj is implemented after a corresponding initialization bINITSNj, and, in the example of FIG. 6, before the transfer phase bTRj marking the end of integration phase bINTj.

In this example, each reading of an initialization level of a group Gj comprises the succession of a phase bINITSNj and of a readout phase RDj, and the control circuit is configured to keep non-conductive each initialization transistor connected between the node SNi of pixel Pixi of said group Gj and either the node SNi of a pixel Pixi of another group Gj, or node 100, from the end of this phase bNIITSNj to the beginning of this phase bRDj.

Thus, in the example of FIG. 6:
during each phase bINITSN1, the transistors RST1, RTS2, RST3, and RST4 which couple nodes SN1, SN2, SN3, and SN4 to node 100 are simultaneously kept in the conductive state;
during each phase bINITPD1, while a phase bINITSN1 is being implemented, gates TG1, TG2, TG3, and TG4 are set to the conductive state, preferably simultaneously;
during each phase bTR1, the transistor RST1 which is connected between the node SN1 of pixel Pix1 and node 100 is kept non-conductive;
in this example, during each phase bTR1, a single charge transfer is implemented by means of a single setting to the conductive state, preferably simultaneous, of each of the gates TG1, TG2, TG3, and TG4 of the pixels of group G1;
during each phase bRD1, the transistor RST1 which is connected between the node SN1 of pixel Pix1 and node 100 is kept non-conductive;
between each phase bTR1 and the next phase bRD1 where the signal level of nodes SN1, SN2, SN3, and SN4 is read, the transistor RST1 which is connected between the node SN1 of pixel Pix1 and node 100 is kept non-conductive;
from the end of each phase bINITSN1 preceding a corresponding phase bRD1 of reading of an initialization level of the nodes SN1, SN2, SN3, and SN4 of the pixels in the group, until the beginning of this phase bRD1, the transistor RST1 which is connected between the node SN1 of pixel Pix1 and node 100 is kept non-conductive; and
in this example, between each phase bRD1 of reading of an initialization level of nodes SN1, SN2, SN3, and SN4 and the next phase bTR1, the transistor RST1 which is connected between the node SN1 of pixel Pix1 and node 100 is kept non-conductive.

Examples of embodiments and variants where the sensor described in relation with FIG. 1 or 4 operates in rolling shutter mode and, selectively in full resolution or in extended dynamic range.

The sensor described in relation with FIGS. 1 and 4 may also, in other embodiments, operate in global shutter and, selectively, in full resolution or extended dynamic range as will now be described in relation with FIGS. 8, 9, and 10.

Figure 8:
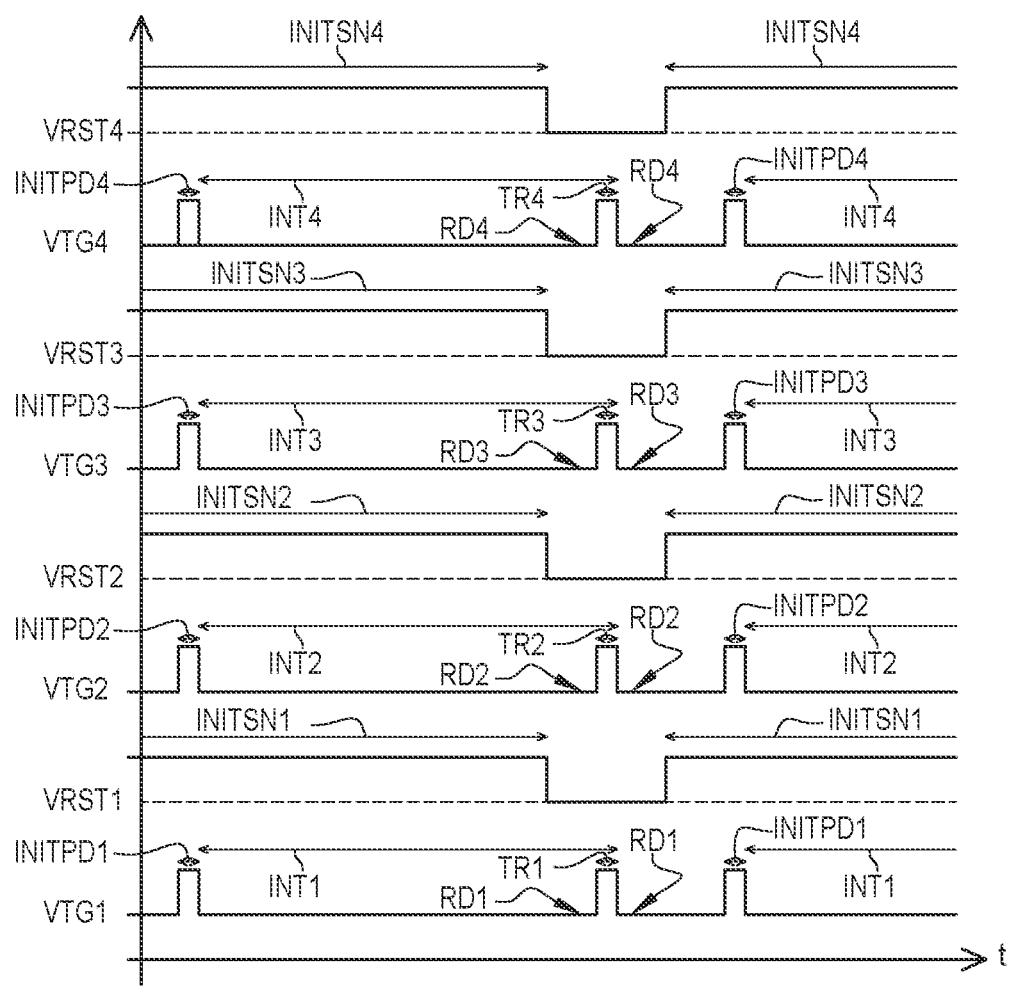
FIG. 8 shows timing diagrams illustrating an example of still another operating mode of the pixels of FIG. 4.

In practice, in full resolution operation, the phases INITPDi, INITSNi, TRi, RDi, and INTi described for each pixel Pixi for a rolling shutter operation (FIGS. 2 and 5) apply for a global shutter operation, with the difference that phases INITSNi, INITPDi, TRi, RDi, and INTi are implemented simultaneously in all the pixels Pixi of an association of N successive pixels of the sensor, as will now be illustrated in relation with FIG. 8.

FIG. 8 shows timing diagrams illustrating an example of an operating mode of the pixels of FIG. 4, in the case where the sensor operates in global shutter and in full resolution. Thus, in this example, N is equal to 4.

In this example, simultaneously for each pixel Pixi, the sensor successively implements: a phase INITPDi of initialization of the photodiode PDi of the pixel, during a phase INITSNi of initialization of the node SNi of this pixel; an integration phase INTi starting at the end of phase INITPDi; a charge transfer phase TRi implemented at the end of integration INTi; a readout phase RDi implemented after this transfer phase TRi, to read a signal level of node SNi; and after this phase RDi of reading of the signal level of node SNi, a repeating of the above phases.

In this example, each reading of a signal level of a pixel Pixi comprises the succession of a transfer phase TRi and of a readout phase RDi, and the control circuit is configured to keep non-conductive each initialization transistor connected to the node SNi of pixel Pixi from the end of this phase TRi to the beginning of phase RDi.

Further, in this example, a correlated double sampling is implemented. Thus, for each integration phase INTi of each pixel Pixi, there is a second readout phase RDi to read an initialization level of the node SNi of pixel Pixi. This second phase RDi is implemented after a phase INITSNi of initialization of the node SNi of this pixel, and, in the example of FIG. 8, before the transfer phase TRi marking the end of integration phase INTi.

In this example, each reading of an initialization level of a pixel Pixi comprises the succession of an initialization phase INITSNi and of a readout phase RDi, and the control circuit is configured to keep non-conductive each initialization transistor connected to the node SNi of pixel Pixi from the end of this phase INITSNi to the beginning of this phase RDi.

In the example of FIG. 8, each transistor RSTi is in the conductive, respectively non-conductive, state when the corresponding signal VRSTi is in the high, respectively low, state and, further, each transfer gate TGi is conductive, respectively non-conductive, when the corresponding signal VTGi is in the high, respectively low, state.

Thus, in the example of FIG. 8, for pixel Pix4:
during each phase INITSN4, the transistors RST1, RTS2, RST3, and RST4 which couple node SN4 to node 100 are simultaneously kept in the conductive state;
during each phase INITPD4, while a phase INITSN4 is being implemented, gate TG4 is set to the conductive state;
during each phase TR4, transistor RST4 is kept non-conductive;
in this example, during each phase TR4, a single charge transfer is implemented by means of a single setting to the conductive state of gate TG4;
during each phase RD4, transistor RST4 is kept non-conductive;

between each phase TR4 and the next phase RD4 where signal level SN4 is read, transistor RST4 is kept non-conductive;

from the end of each phase INITSN4 preceding a corresponding phase of reading of an initialization level of node SN4, to the beginning of this phase RD4, transistor RST4 is kept non-conductive; and in this example, between each phase RD4 of reading of an initialization level of node SN4 and the next phase TR4, the transistors RSTi which are connected to node SN4, that is, only transistor RST4 in this example, are kept non-conductive.

Similarly, for pixel Pix3:

during each phase INITSN3, the transistors RST1, RTS2, and RST3 which couple node SN3 to node 100 are simultaneously kept in the conductive state;

during each phase INITPD3, while a phase INITSN3 is being implemented, gate TG3 is set to the conductive state;

during each phase TR3, transistors RST3 and RST4 are kept non-conductive;

in this example, during each phase TR3, a single charge transfer is implemented by means of a single setting to the conductive state of gate TG3;

during each phase RD3, transistors RST3 and RST4 are kept non-conductive;

between each phase TR3 and the next phase RD3 where signal level SN3 is read, transistors RST3 and RST4 are kept non-conductive;

from the end of each phase INITSN3 preceding a corresponding phase RD3 of reading of an initialization level of node SN3, to the beginning of this phase RD3, transistors RST3 and RST4 are kept non-conductive; and in this example, between each phase RD3 of reading of an initialization level of node SN3 and the next phase TR3, the transistors RSTi which are connected to node SN3, that is, transistors RST3 and RST4 in this example, are kept non-conductive.

Similarly, for pixel Pix2:

during each phase INITSN2, the transistors RST1 and RTS2 which couple node SN2 to node 100 are simultaneously kept in the conductive state;

during each phase INITPD2, while a phase INITSN2 is being implemented, gate TG2 is set to the conductive state;

during each phase TR2, the transistors RSTi which are connected to node SN2, that is, transistors RST2 and RST3 in this example, are kept non-conductive;

in this example, during each phase TR2, a single charge transfer transistor is implemented by means of a single setting to the conductive state of gate TG2;

during each phase RD2, transistors RST2 and RST3 are kept non-conductive;

between each phase TR2 and the next phase RD2 where signal level SN2 is read, transistors RST2 and RST3 are kept non-conductive;

from the end of each phase INITSN3 preceding a corresponding phase RD3 of reading of an initialization level of node SN3, to the beginning of this phase RD3, transistors RST2 and RST3 are kept non-conductive; and in this example, between each phase RD2 of reading of an initialization level of node SN2 and the next phase TR2, the transistors RSTi which are connected to node SN2, that is, transistors RST2 and RST3 in this example, are kept non-conductive.

Similarly, for pixel Pix1:

during each phase INITSN1, the transistor RST1 which couples node SN1 to node 100 is kept in the conductive state;

during each phase INITPD1, while a phase INITSN1 is being implemented, gate TG1 is set to the conductive state;

during each phase TR1, transistors RST1 and RST2 are kept non-conductive;

in this example, during each phase TR1, a single charge transfer is implemented by means of a single setting to the conductive state of gate TG1;

during each phase RD1, transistors RST1 and RST2 are kept non-conductive;

between each phase TR1 and the next phase RD1 where signal level SN1 is read, transistors RST1 and RST2 are kept non-conductive;

from the end of each phase INITSN1 preceding a corresponding phase RD1 of reading of an initialization level of node SN1, to the beginning of this phase RD1, transistors RST1 and RST2 are kept non-conductive; and in this example, between each phase RD1 of reading of an initialization level of node SN1 and the next phase TR1, the transistors RSTi which are connected to node SN1, that is, transistors RST1 and RST2 in this example, are kept non-conductive.

According to an embodiment where the sensor operates in full resolution, as illustrated in FIG. 8, so that each node SNi sees, at the end of each initialization phase INITSNi of this node, the same charge injection resulting from the setting to the non-conductive state of the transistors RSTi which couple this node SNi to node 100, the first one of the transistors RSTi which couples this node SNi to be set to the non-conductive state is that of the pixel Pixi comprising this node SNi. In other words, when an initialization phase is implemented simultaneously in two successive pixels Pixi, the initialization phase of that of the two pixels Pixi which is most distant from node 100 is first ended by switching to the non-conductive state its transistor RSTi, after which the initialization phase of that of the pixels which is closest to node 100 is ended by switching to the non-conductive state its transistor RSTi. This embodiment may apply to all the embodiments described in the present application where the sensor operates in full resolution.

For example, in FIG. 8, each phase INITSN4 of initialization of the node SN4 of pixel Pix4 is implemented simultaneously with a phase INITSN3 of initialization of node SN3. Due to the fact that, between pixels Pix3 and Pix4, pixel Pix3 is that closest to node 100 and pixel Pix4 is the most distant from this node 100, initialization phase INITSN4 ends by switching to the non-conductive state transistor RST4, after which initialization phase INITSN3 ends by switching to the non-conductive state transistor RST3. Thus, the charge injection on node SN4 resulting from the end of phase INITSN4 is the same as the charge injection on node SN3 resulting from the end of phase INISN3. Similarly, in FIG. 8, each phase INITSN3 ends before the end of the corresponding phase INITSN2, and each phase INITSN2 ends before the end of a corresponding phase INITSN1.

Further, in a global shutter operating mode, as known by those skilled in the art, each phase RDi of reading of a node SNi may comprise a storage, by circuit OUTi, of the initialization or signal level read from this node SNi, the stored level(s) then being read during a phase of reading of pixel Pixi, for example, when the sensor pixels are read by simultaneously reading all the pixels in a row, one row after the other. This may also apply to a rolling shutter operating mode.

Figure 9:
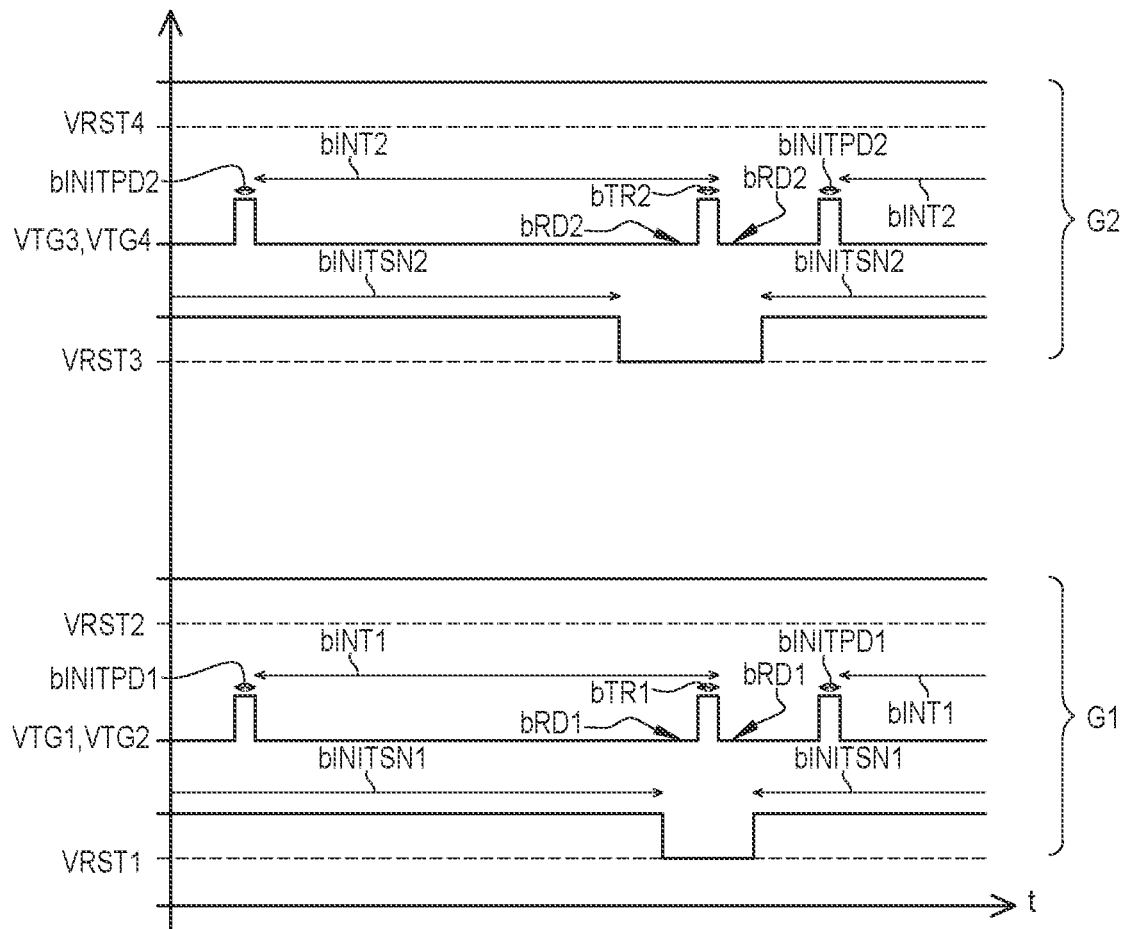
FIG. 9 shows timing diagrams illustrating an example of still another operating mode of the pixels of FIG. 4.
Figure 10:
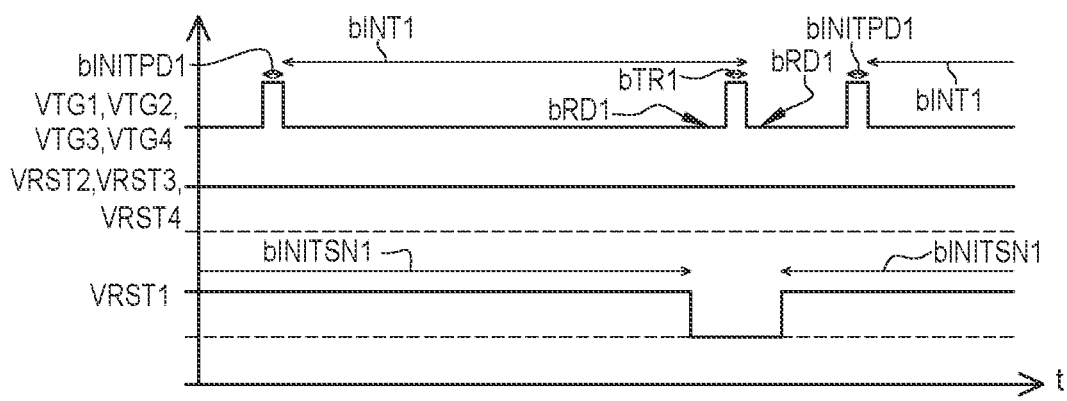
FIG. 10 shows timing diagrams illustrating another example of the operating mode of FIG. 9.

In practice, in extended dynamic range operation, the phases bINITPDj, bINITSNj, bTRj, bRDj, and bINTj described for each group Gj of pixels Pixi for a rolling shutter operation (FIGS. 3, 6, and 7) apply in global shutter operation, with the difference that phases INITSNi, INITPDi, TRi, RDi, and INTi are implemented simultaneously in all the pixels Pixi of an association of N successive pixels of the sensor, as will now be illustrated in relation with FIGS. 9 and 10.

FIG. 9 shows timing diagrams illustrating an example of an operating mode of the pixels of FIG. 4, in the case where the sensor operates in global shutter and in extended dynamic range.

More particularly, FIG. 9 illustrates an example of global shutter and extended dynamic range operation where N is equal to 4, K is equal to 2, and M is thus equal to 2.

In this example, group G1 comprises the successive pixels Pix1 and Pix2, and group G2 comprises the successive pixels Pix3 and Pix4. Thus, resuming what has already been indicated in relation with FIGS. 3, 6, and 7, that is, in each group Gj, each transistor RSTi connecting the nodes SNi of two pixels Pixi in the group is kept conductive, and applying it to the example of FIG. 9, then transistors RST2 and RST4 are kept conductive.

In this example, for each group Gj, the sensor successively implements:
  a phase bINITPDj of initialization of the photodiodes PDi of the pixels Pixi in this group, during a phase bINITSNj of initialization of the nodes SNi of the pixels Pixi in this group;
  an integration phase bINTj starting at the end of phase bINITPDj;
  a phase bTRj of transfer of the charges photogenerated in the photodiodes PDi of the pixels Pixi of group Gj to the nodes SNi of these pixels implemented at the end of integration bINTj;
  a first phase bRDj of reading of the nodes SNi of the pixels Pixi of group Gj implemented after this transfer phase bTRj, to read a signal level of these nodes SNj; and
  after this phase RDj of reading of the signal level of the nodes SNi of the pixels of group Gj, a repeating of the above phases.

In this example, each reading of a signal level of a group Gj comprises the succession of a transfer phase bTRj and of a readout phase RDj, and the control circuit is configured to keep non-conductive each initialization transistor connected between the node SNi of a pixel Pixi of said group Gj and either the node SNi of a pixel Pixi of another group Gj, or node 100, from the end of this phase bTRj to the beginning of this phase bRDj.

Further, in this example, a correlated double sampling is implemented. Thus, for each phase bINTj of integration of each group Gj, there is a second readout phase bRDj to read an initialization level of the nodes SNi of the pixels Pixi in the group. This second phase bRDj is implemented after a corresponding initialization bINITSNj, and, in the example of FIG. 9, before the transfer phase bTRj marking the end of integration phase bINTj.

In this example, each reading of an initialization level of a group Gj comprises the succession of a phase bINITSNj and of a readout phase RDj, and the control circuit is configured to keep non-conductive each initialization transistor connected between the node SNi of a pixel Pixi of said group Gj and either the node SNi of a pixel Pixi of another group Gj, or node 100, from the end of this phase bNIITSNj to the beginning of this phase bRDj.

In the example of FIG. 9, as in the previous examples, each transistor RSTi is in the conductive, respectively non-conductive, state when the corresponding signal VRSTi is in the high, respectively low, state and, further, each transfer gate TGi is conductive, respectively non-conductive, when the corresponding signal VTGi is in the high, respectively low state.

In the example of FIG. 9, for group G2:
  during each phase bINITSN2, the transistors RST1, RTS2, RST3, and RST4 are simultaneously kept in the conductive state;
  during each phase bINITPD2, while a phase bINITSN2 is being implemented, gates TG3 and TG4 are set to the conductive state;
  during each phase bTR2, transistor RST3 is kept non-conductive;
  in this example, during each phase bTR2, a single charge transfer is implemented by means of a single setting to the conductive state, preferably simultaneous, of each of the gates TG3 and TG4 of the pixels Pix3 and Pix4 of group G2;
  during each phase bRD2, transistor RST3 is kept non-conductive;
  between each phase bTR2 and the next phase bRD2 where the signal level of nodes SN3 and SN4 is read, transistor RST3 is kept non-conductive;
  from the end of each phase bINITSN2 preceding a corresponding phase bRD2 of reading of an initialization level of the nodes SN3 and SN4 of the pixels in the group, until the beginning of this phase bRD2, transistor RST3 is kept non-conductive; and
  in this example, between each phase bRD2 of reading of an initialization level of nodes SN3 and SN4 and the next phase bTR2, the transistor RST3 which is connected between the node SN3 of the pixel Pix3 of group G2 and the node SN2 of the pixel Pix2 of group G1 is kept non-conductive.

Similarly, for group G1:
  during each phase bINITSN1, the transistors RST1 and RTS2 which couple nodes SN2 and SN1 to node 100 are simultaneously kept in the conductive state;
  during each phase bINITPD1, while a phase bINITSN1 is being implemented, gates TG1 and TG2 are set to the conductive state, preferably simultaneously;
  during each phase bTR1, transistor RST1 and RST3 are kept non-conductive;
  in this example, during each phase bTR1, a single charge transfer is implemented by means of a single setting to the conductive state, preferably simultaneous, of each of the gates TG2 and TG1 of the pixels Pix2 and Pix1 of group G1;
  during each phase bRD1, transistors RST1 and RST3 are kept non-conductive;
  between each phase bTR1 and the next phase bRD1 where the signal level of nodes SN1 and SN2 is read, transistors RST1 and RST3 are kept non-conductive;
  from the end of each phase bINITSN1 preceding a corresponding phase of reading of an initialization level of the nodes SN2 and SN1 of the pixels Pix2 and Pixi in group G1, until this phase bRD1, transistor RST1 and RST3 are kept non-conductive; and
  in this example, between each phase bRD1 of reading of an initialization level of nodes SN1 and SN2 and the next phase bTR1, the transistor RST1 which is connected between the node SN1 of pixel Pix1 of group G1 and node 100, and the transistor RST3 which is connected between the node SN2 of the pixel Pix2 of group G1 and the node SN3 of the pixel Pix3 of the other group G2 are kept non-conductive.

According to an embodiment where the sensor operates in extended dynamic range, as illustrated in FIG. 9, for each group Gj, the nodes of each group see, at the end of each phase bINITSNj of initialization of the nodes in this group, the same charge injection resulting from the setting to the non-conductive state of each transistor RSTi connected between a node SNi of a pixel of a group Gj and node 100 or a node SNi of a pixel of another group Gj. For this purpose, the control circuit is configured, for each simultaneous phase bINITSNj in two successive groups, to:

end the phase bINITSNj of that of the two groups Gj which is most distant from node 100, by switching to the non-conductive state the transistor RSTi of the pixel Pixi which is closest to node 100 in this group Gj, then end the phase bINITSNj of that of the two groups Gj which is closest to node 100, by switching to the non-conductive state the transistor RSTi of the pixel Pixi which is closest to node 100 in this group Gj.

This embodiment may apply to all the embodiments described in the present disclosure where the sensor operates in extended dynamic range.

For example, in FIG. 9, each initialization phase bINITSN2 of group G2 is implemented simultaneously to a phase bINITSN1 of group G1. Due to the fact that, between groups G1 and G2, G1 is the closest to node 100 and group G2 is the most distant from this node 100, initialization phase bINITSN2 ends by switching to the non-conductive state the transistor RST3 of pixel Pix3 which is closest to node 100 in group G2, after which initialization phase bINITSN1 ends by switching to the non-conductive state the transistor RTS1 of the pixel Pix1 which is the closest to node 100 in group G1. Thus, the charge injection onto the nodes SN4 and SN3 of group G1 at the end of phase bINITSN1 is the same as the charge injection onto the nodes SN2 and SN1 of group G2 at the end of phase bINITSN2.

FIG. 10 shows timing diagrams illustrating another example of the operating mode described in relation with FIG. 9.

More particularly, FIG. 10 illustrates, like FIG. 9, an example of global shutter and extended dynamic range operation, with the difference that, in FIG. 10, N is equal to 4, K is equal to 1, and M is thus equal to 4. In other words, FIG. 10 illustrates what has been described for N equal to 4 in relation with FIG. 9, when this is adapted to the case of a single group G1 of 4 pixels. Thus, unless indicated otherwise, all that has been described in relation with FIG. 9 applies to FIG. 10.

In this example, resuming what has already been indicated in relation with FIGS. 3, 6, 7, and 9, that is, that, in each group Gj, each transistor RSTi connecting the nodes SNi of two pixels Pixi in the group is kept conductive, and applying it to the example of FIG. 10, then transistors RST2, RST3, and RST4 are kept conductive.

In this example, each reading of a signal level of a group Gj comprises the succession of a transfer phase bTRj and of a readout phase RDj, and the control circuit is configured to keep non-conductive each initialization transistor connected between the node SNi of a pixel Pixi of said group Gj and either the node SNi of a pixel Pixi of another group Gj, or node 100, from the end of this phase bTRj to the beginning of this phase bRDj.

Further, in this example, a correlated double sampling is implemented. Thus, for each integration phase bINTj of each group Gj, in addition to a first readout phase bRDj to read a signal level of the nodes SNi of the pixels Pixi in the group, there is a second readout phase bRDj to read an initialization level of the nodes SNi of the pixels Pixi in the group. This second phase bRDj is implemented after a corresponding initialization bINITSNj, and, in the example of FIG. 6, before the transfer phase bTRj marking the end of integration phase bINTj.

In this example, each reading of an initialization level of a group Gj comprises the succession of a phase bINITSNj and of a readout phase RDj, and the control circuit is configured to keep non-conductive each initialization transistor connected between the node SNi of a pixel Pixi of said group Gj and either the node SNi of a pixel Pixi of another group Gj, or node 100, from the end of this phase bNIITSNj to the beginning of this phase bRDj.

Thus, in the example of FIG. 10:

during each phase bINITSN1, the transistors RST1, RTS2, RST3, and RST4 are simultaneously kept in the conductive state;

during each phase bINITPD1, while a phase bINITSN1 is being implemented, gates TG1, TG2, TG3, and TG4 are set to the conductive state, preferably simultaneously;

during each phase bTR1, the transistor RST1 which is connected between nodes SN1 and 100 is kept non-conductive;

in this example, during each phase bTR1, a single charge transfer is implemented by means of a single setting to the conductive state, preferably simultaneous, of each of the gates TG1, TG2, TG3, and TG4 of the pixels of group G1;

during each phase bRD1, transistor RST1 is kept non-conductive;

between each phase bTR1 and the next phase bRD1 where the signal level of the nodes SN1, SN2, SN3, and SN4 is read, transistor RST1 is kept non-conductive;

between the end of each phase bINITSN1 preceding a corresponding phase bRD1 of reading of an initialization level of the nodes SN1, SN2, SN3, and SN4 of the pixels in the group, and this phase bRD1 of reading, transistor RST1 is kept non-conductive; and in this example, between each phase bRD1 of reading of an initialization level of nodes SN1, SN2, SN3, and SN4 and the next phase bTR1, the transistor RST1 which is connected between the node SN1 of pixel Pix1 and node 100 is kept non-conductive.

Examples of embodiments and variants where the sensor described in relation with FIG. 1 or 4 operates in rolling shutter or in global shutter mode and, selectively in full resolution or in extended dynamic range have been described hereinabove.

The sensor described in relation with FIGS. 1 and 4 may also, in other embodiments, operate in indirect time of flight sensing, and, selectively, in full resolution or in extended dynamic range, as will now be described in relation with FIGS. 11, 12, 13, and 14.

As an example, in an indirect time of flight sensor, a light signal modulated at a given frequency is emitted by the sensor towards a scene to be imaged, and the sensor pixels receive a light signal reflected by the scene. The sensor pixels are then configured to acquire samples of the reflected light signal, for example, at least two samples per period of the light signal, each corresponding to a different phase shift with respect to the reflected light signal. Based on these samples, acquired by the sensor pixels, it is possible to determine, for each point of the scene to be imaged, a phase shift between the emitted light signal and the corresponding light signal reflected by this point in the scene. Based on this phase shift, it is possible to determine a distance between this point in the scene and the sensor. In such a sensor, each pixel is for example configured to acquire a plurality of samples for one, two, three, or four different phase shifts with respect to the emitted signal.

For example, each pixel Pixi previously described in relation with FIGS. 1 and 4 may enable to acquire samples with a single phase shift with respect to the emitted signal by adding, in each pixel Pixi, a transistor for initializing the pixel photodiode PDi. This photodiode initialization transistor is thus connected between the photodiode and the initialization potential of photodiode PDi, for example, potential Vrst. During a transfer phase, here corresponding to an integration phase, a plurality of successive transfers of photogenerated charges are implemented towards the node SNi of pixel Pixi via gate TGi, and, between two transfers to node SNi, the charges of the photodiode are discharged to the photodiode initialization potential via the additional photodiode initialization transistor.

Figure 11:
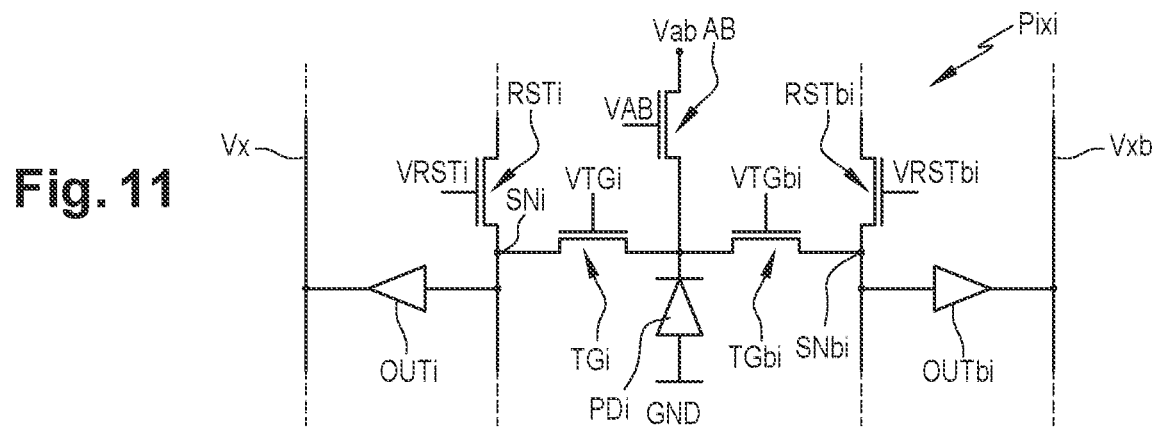
FIG. 11 schematically shows a pixel of a light sensor according to still another embodiment.

FIG. 11 illustrates a pixel of an iToF sensor according to another example of an embodiment. More particularly, FIG. 11 illustrates a pixel Pixi of an association of N successive pixels Pixi of a same column of the sensor.

Although the sensor is not entirely shown in FIG. 11, the sensor comprises an array of pixels organized in rows and in columns. Preferably, the columns are all identical and the rows are all identical. Further, the sensor comprises a pixel control circuit, not shown in FIG. 11.

Although this is not illustrated in FIG. 11, each column of the sensor may comprise exactly one association of N pixels Pixi connected together as illustrated in FIG. 1, or also a plurality of successive associations of N pixels Pixi in each of which the N pixels are connected together as illustrated in FIG. 11.

The pixel Pixi of FIG. 11 comprises many elements in common with the pixels Pixi previously described in relation with FIGS. 1 and 4, and only the differences between the pixel Pixi of FIG. 11 and the previously-described pixels Pix are here highlighted.

As compared with the previous pixels Pixi, the pixel Pixi of FIG. 11 comprises a second sense node SNbi coupled to photodiode PDi, in this example by a second transfer gate TGbi, for example, connected between photodiode PDi and node SNbi. For example, gate TGbi is connected to the same electrode of photodiode PDi as gate TGi. For example, gate TGbi receives a control signal VTGbi, for example delivered by the pixel control circuit. Thus, every two charge transfers to the pixel node SNi is alternated with a charge transfer to node SNbi.

For example, pixel Pixi further comprises a circuit OUTbi for reading of the pixel node SNbi. Circuit OUTbi is connected to node SNbi. As an example, when the N pixels Pixi belong to a same column, in each of the N pixels Pixi, as illustrated in FIG. 11 for a pixel Pixi, circuit OUTbi couples the pixel node SNbi to a conductive line Vbx common to all the pixels in the column, this line Vxb having, for example, one end connected to a circuit for reading the pixels in the column.

As a variant, the circuit OUTi of pixel Pix is also connected to node SNbi and allows the reading of the two nodes SNi and SNbi of the pixel.

As illustrated for a pixel Pixi in FIG. 11, each of the N pixels Pixi further comprises a transistor RSbTi connected to the pixel node SNbi. More particularly, in each of the N pixels Pixi, transistor RSTbi, respectively RSTi, has a first conduction terminal connected to node SNbi, respectively SNi. In each of the N pixels, transistor RSTbi is, for example, identical to transistor RSTi. As an example, transistor RSTbi and transistor RSTi are controlled identically in each pixel Pixi.

Although this is not illustrated in FIG. 11, similarly to what has been indicated in relation with FIG. 1 or FIG. 4, one of the N pixels Pixi arranged at an end of the association of the N successive pixels Pixi in the column has its transistor RSTi, respectively RSTbi, which is connected between node SNi, respectively SNbi, of the pixel and the node 100 of application of an initialization potential Vrst.

As an example, pixel Pix1 has its transistor RST1, respectively RSTb1, connected between node SN1, respectively SNb1, and node 100. More particularly, transistor RST1 has its second conduction terminal connected to node 100. For example, as was already the case in FIGS. 1 and 4, the index i of the N successive pixels increases away from node 100.

The other ones of the N pixels Pixi, that is, all the pixels Pixi except for that which has its transistor RSTi, respectively RSTbi, connected to node 100, each have their transistor RSTi, respectively RSTbi, which is connected between the node SNi, respectively SNbi, of the pixel and the node SNi-1, respectively SNBi-1, of the neighboring pixel Pixi-1. In other words, each pixel Pixi has the second conduction terminal of its transistor RSTi, respectively RSTbi, which is connected to the node SNi-1, respectively SNbi-1, of the neighboring pixel Pix-1. In other words, for each two successive pixels Pixi among the N pixels, that of the two pixels which is the most distant from node 100 has its transistor RSTi, respectively RSTbi, connected between the nodes SNi, respectively SNbi, of these two pixels.

Further, in the example of FIG. 11, pixel Pixi comprises a transistor AB connected between photodiode PDi and a node 1100 of application of a potential Vab. Transistor AB is controlled by a signal VAB applied to its gate, for example, by the pixel control circuit. This transistor AB is for example the transistor of initialization of the photodiode PDi of pixel Pixi, which is set to the conductive state to initialize photodiode PDi. This transistor AB may also be used to implement an anti-glare function, for example, by adapting the value of the level of signal VAB when this anti-glare function is implemented.

The pixel Pixi of FIG. 11 enables to capture (or transfer) on node SNi samples with a first phase shift with respect to the transmitted signal, for example, by making conductive, at each period of the transmitted signal, gate TGi for a fraction of the period of the transmitted signal. The pixel Pixi of FIG. 11 enables to capture (or transfer) on node SNbi samples with a second phase shift with respect to the transmitted signal, for example, by making conductive, at each period of the transmitted signal, gate TGbi for a fraction of the period of the transmitted signal.

Those skilled in the art will be capable of adapting the description made hereinabove in relation with FIG. 11 to the case of a pixel Pixi configured to acquire samples with three different phase shifts, for example, by connecting to photodiode PDi a third assembly of a transfer gate, of a sense node, of a transistor of initialization of the transfer node and, for example, of a readout circuit connected, for example, to a corresponding read line. Those skilled in the art will also be capable of adapting the description made hereinabove in relation with FIG. 11 to the case of a pixel Pixi configured to acquire samples with four different phase shifts, for example, by connecting to photodiode PDi, in addition to the third assembly introduced hereinabove, a fourth assembly of a transfer gate, of a sense node, of a transistor of initialization of the transfer node and, for example, of a readout circuit connected, for example, to a corresponding read line.

In a sensor comprising pixels Pixi operating in indirect time of flight sensing, for N successive pixels Pixi of a same column, for example N pixels Pix such as described in relation with FIG. 11, the operation of pixels Pixi is similar to the global shutter operation, with the difference that each phase of transfer of photogenerated charges to a sense node of the pixel comprises a plurality of successive charge transfers. For example, a phase of transfer of charges photogenerated in photodiode PDi to the node SNi of a pixel Pixi comprises a plurality of successive transfers, each comprising a setting to the conductive state of the corresponding gate TGi, each two successive transfers being separated from each other by a setting to the non-conductive state of this gate TGi.

More generally, in full resolution operation, the phases INITPDi, INITSNi, TRi, RDi, and INTi described for each pixel Pixi for a rolling shutter (FIGS. 2 and 5) or global shutter (FIG. 8) operation apply to an indirect time of flight sensing operation, with the difference that phases TRi each comprise a plurality of successive transfers to each sense node of pixel Pixi as will now be illustrated in relation with FIG. 8. In an indirect time of flight sensing operation, like for a global shutter operation, phases INITSNi, INITPDi, TRi, RDi, and INTi are simultaneously implemented in all the pixels Pixi of an association of N successive pixels of the sensor.

Figure 12:
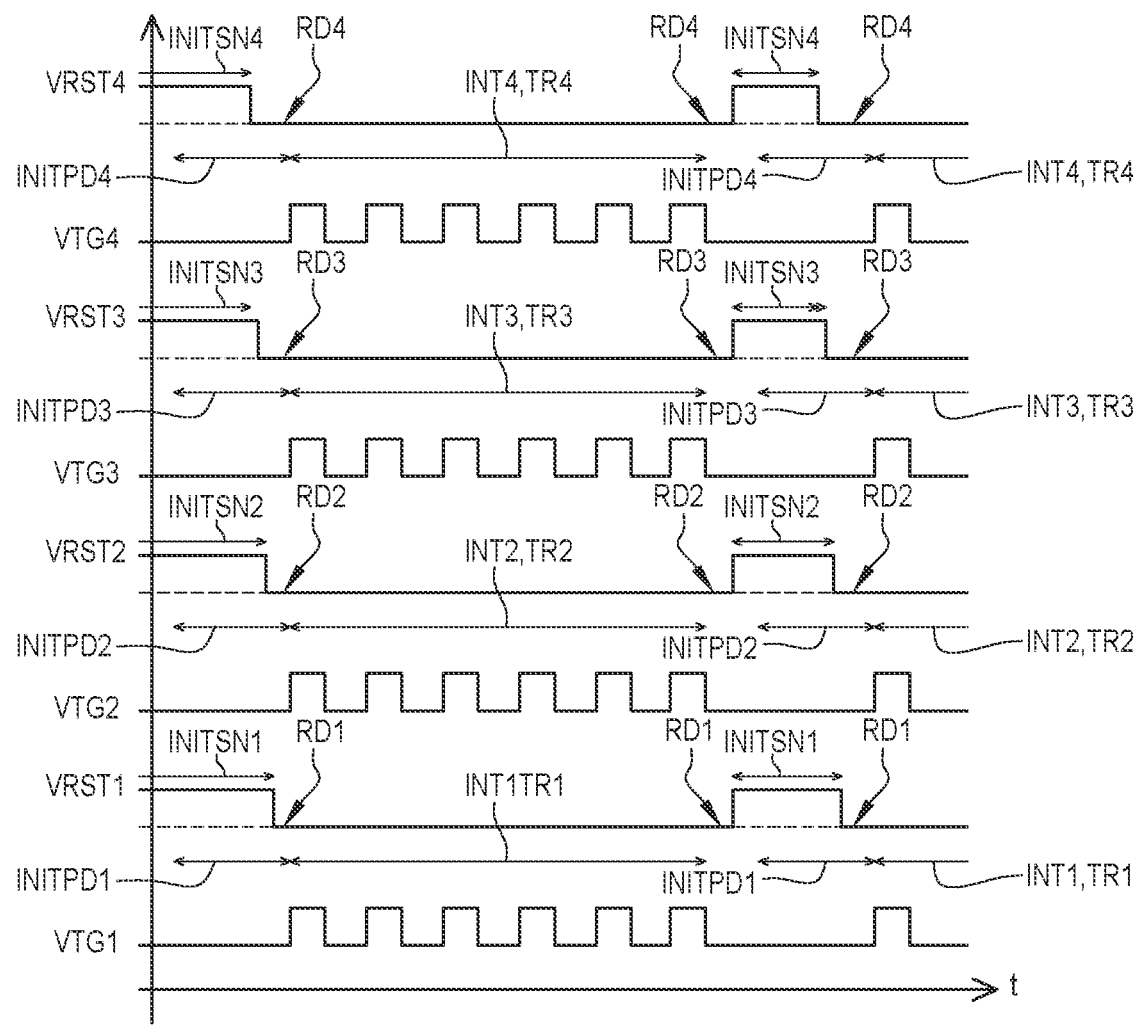
FIG. 12 shows timing diagrams illustrating an example of an operating mode of a plurality of pixels of FIG. 11.

FIG. 12 shows timing diagrams illustrating an example of an operating mode of the pixel Pixi of FIG. 11, in the case where the sensor operates in indirect time of flight sensing and in full resolution.

The example of FIG. 12 more particularly corresponds to the example of FIG. 4 in the case where each pixel Pixi of FIG. 4 is replaced with a pixel Pixi such as described in relation with FIG. 11. Thus, unless indicated otherwise, what has been described in relation with FIG. 8 applies to FIG. 12.

In the example of FIG. 12, the control signals VTGi of transfer gates TGi have been shown but the signals VTGbi of transfer gates TGbi have not been shown. Indeed, the shape of these signals VTGbi is within the abilities of those skilled in the art based on the present description and on their general knowledge in the field of indirect time of flight sensors.

Further, in the example of FIG. 12, the control signals VRSTbi of transistors RSTbi have not been shown. Indeed, in this example, in each pixel Pixi, transistors RSTi and RSTbi are controlled in the same way, and signals VRSTi and VRSTbi are thus identical.

In the example of FIG. 12, simultaneously for each pixel Pixi, the sensor implements:
  a phase INITSNi (INITSN1, INITSN2, INITSN3, INITSN4 in FIG. 12) of initialization of each sense node SNi and SNbi of the pixel;
  a phase INITPDi (INITPD1, INITPD2, INITPD3, INITPD4 in FIG. 12) of initialization of the pixel photodiode PDi, corresponding in this example to a conductive state of transistor AB of the pixel;
  an integration phase INTi (INT1, INT2, INT3, and INT4 in FIG. 12) starting at the end of phase INITPDi, which corresponds in this example to a switching to the non-conductive state of the transistor AB of the pixel;
  a charge transfer phase TRi (TR1, TR2, TR3, and TR4 in FIG. 12) corresponding to integration phase INTi, and here comprising a plurality of successive and alternated transfers to each of the sense nodes SNi and SNbi of pixel Pixi;
  a readout phase RDi (RD1, RD2, RD3, and RD4 in FIG. 12) implemented after this transfer phase TRi, to read a signal level of each of the sense nodes SNi and SNbi of the pixel;
  and after this phase RDi of reading of the signal level of each sense node SNi, SNbi of the pixel, a repeating of the above phases.

In the example of FIG. 12, each phase INITPDi is very schematically represented by a duration corresponding to the implementation of this phase INITPDi.

In this example, each phase INITPDi corresponds to the conductive state of transistor AB and is thus likely not to be implemented, totally or partly, during a corresponding phase INITSNi. Further, the end of each phase INITPDi corresponds to the setting to the non-conductive state of transistor AB.

In this example, each reading of a signal level of the node SNi of a pixel Pixi comprises the succession of a transfer phase TRi and of a readout phase RDi, and the control circuit is configured to keep non-conductive each initialization transistor RSTi connected to the node SNi of pixel Pixi from the end of this phase TRi to the beginning of phase RDi.

Further, in this example, a correlated double sampling is implemented. Thus, for each phase INTi of integration of each pixel Pixi, there is a second readout phase RDi (RD1, RD2, RD3, and RD4 in FIG. 12) to read an initialization level of each sense node of pixel Pixi. This second phase RDi is implemented after a phase INITSNi of initialization of the sense nodes of the pixel, and, in the example of FIG. 11, before the transfer phase TRi following this phase INITSNi.

In this example, each reading of an initialization level of the node SNi of a pixel Pixi comprises the succession of an initialization phase INITSNi and of a readout phase RDi, and the control circuit is configured to keep non-conductive each initialization transistor RSTi connected to the node SNi of pixel Pixi from the end of this phase INITSNi to the beginning of this phase RDi. As an example, in FIG. 12, each phase INITPDi ends after the reading of an initialization level of the sense nodes of pixel Pixi.

Thus, FIG. 12 is similar to FIG. 8, with the difference that:
  each integration phase INTi is one and the same as, or corresponds to, a transfer phase TRi;
  each phase TRi comprises a plurality of successive transfers, each corresponding to a setting to the conductive state of a transfer gate of pixel Pixi; and
  each initialization phase INITPDi is, in this example, implemented by a setting to the conductive state of transistor AB, signal VAB not being illustrated in FIG. 12.

As it has already been indicated for a global shutter operation, each phase of reading of a sense node may comprise a storage, by the readout circuit connected to this sense node, of the initialization or signal level read from this sense node, the stored signal(s) being then read from this readout circuit, during a phase of reading of pixel Pixi, for example when the sensor pixels are read one row after the other and simultaneously in each row.

In the example of FIG. 12, the end of phases INITSNi is successively achieved by starting from the pixel Pixi most distant from node 100, so that each sense node sees the same charge injection at the end of the phase INITSNi which concerns it.

It has been illustrated hereinabove that the phases INITPDi, INITSNi, TRi, RDi, and INTi described for each pixel Pixi for a rolling shutter (FIGS. 3 and 5) or global shutter (FIG. 8) operation apply for an indirect time of flight sensing operation, with the difference that phases TRi each comprise a plurality of successive transfers to each sense node of pixel Pixi and, for example, that each phase INITPDi is implemented with the transistor AB of the concerned pixel Pixi, and not necessarily at the same time as an initialization phase INITSNi.

Figure 13:
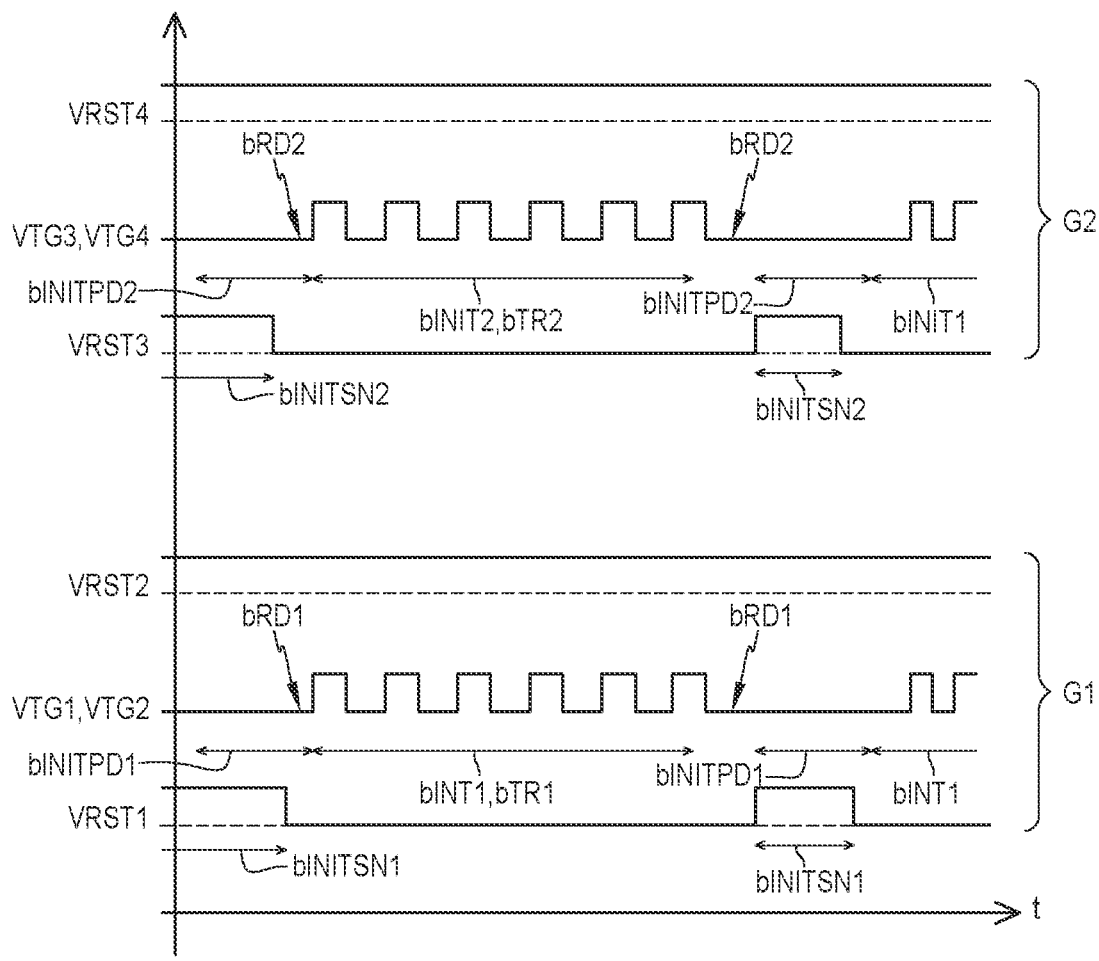
FIG. 13 shows timing diagrams illustrating an example of another operating mode of a plurality of pixels of FIG. 11.
Figure 14:
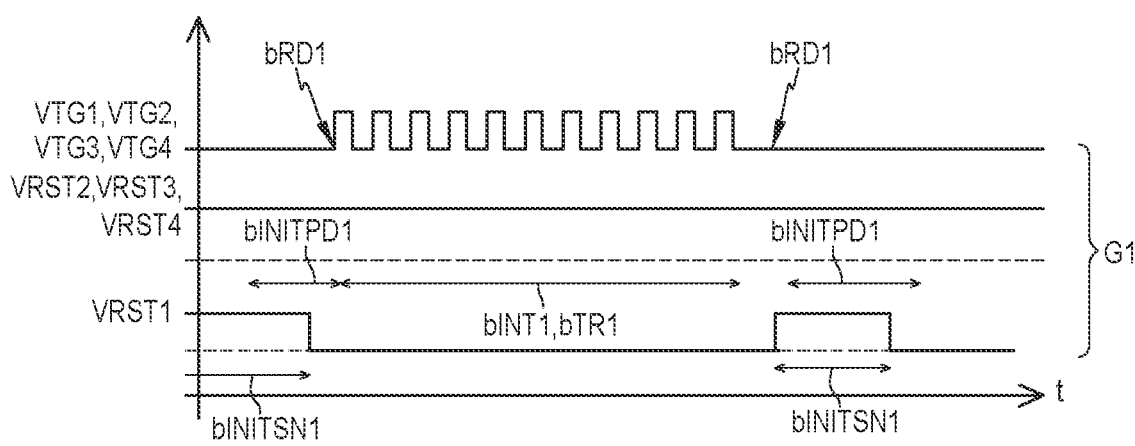
FIG. 14 shows timing diagrams illustrating another example of the operating mode of FIG. 13.

Similarly, the phases bINITPDj, bINITSNj, bTRj, RDj, and bINTj described for each pixel Pixi for an extended dynamic range and rolling shutter (FIGS. 4, 6, and 7) or global shutter (FIGS. 9 and 10) operation apply for an indirect time of flight sensing operation, with the difference that phases bTRj each comprise a plurality of successive transfers to the sense node of the pixels Pixi of group Gj and, for example, that each phase bINITPDj is implemented with the transistor AB of the concerned pixel Pixi, and not necessarily at the same time as an initialization phase bINITSNj, as will now be illustrated in relation with FIGS. 13 and 14.

In an indirect time of flight sensing operation, in the same way as for a global shutter operation, phases bINITSNj, bINITPDj, bTRj, bRDj, and bINTj are implemented simultaneously in all the pixels Pixi of an association of N successive pixels of the sensor.

FIGS. 13 and 14 each show timing diagrams illustrating an example of an operating mode of the pixel Pixi of FIG. 11, in the case where the sensor operates in indirect time of flight sensing and extended dynamic range.

The example of FIG. 13 more particularly corresponds to the example of FIG. 9 in the case where each pixel Pixi of FIG. 4 is replaced with a pixel Pixi such as described in relation with FIG. 11, and where the pixels operate in indirect time of flight sensing rather than in global shutter. In particular, in FIG. 13, N is equal to 4, K is equal to 2, and M is equal to 2, group G1 comprises the successive pixels Pix1 and Pix2, and group G2 comprises the successive pixels Pix3 and Pix4. Thus, unless indicated otherwise, what has been described in relation with FIG. 8 applies to FIG. 13.

The example of FIG. 14 more particularly corresponds to the example of FIG. 10 in the case where each pixel Pixi of FIG. 4 is replaced with a pixel Pixi such as described in relation with FIG. 11, and where the pixels operate in indirect time of flight sensing rather than in global shutter. In particular, in FIG. 14, N is equal to 4, K is equal to 1, M is equal to 4, and group G1 comprises the successive pixels Pix1, Pix2, Pix3, and Pix4. Thus, unless indicated otherwise, what has been described in relation with FIG. 9 applies to FIG. 14.

In FIGS. 13 and 14, the control signals VTGi of transfer gates TGi have been shown but the signals VTGbi of transfer gates TGbi have not been shown. Indeed, the shape of these signals VTGbi is within the abilities of those skilled in the art based on the description and on their general knowledge in the field of indirect time of flight sensors.

Further, in FIGS. 13 and 14, the control signals VRSTbi of transistors RSTbi have not been shown. Indeed, in these examples, in each pixel Pixi, transistors RSTi and RSTbi are controlled in the same way, and signals VRSTi and VRSTbi are thus identical.

In the examples of FIGS. 13 and 14, simultaneously for each group Gj of pixels Pixi, the sensor implements:
a phase of initialization bINITSNj (bINITSN1 and bINITSN2 in FIG. 13, bINITSN1 in FIG. 14) of each sense node SNi and SNbi of the pixels of group Gj (G1 and G2 in FIG. 13, G1 in FIG. 14);
a phase bINITPDj (bINITPD1 and bINITPD2 in FIG. 13, bINITPD1 in FIG. 14) of initialization of the photodiode PDi of each pixel Pixi in the group, corresponding in this example to a conductive state of the transistor AB of each pixel Pixi in the group;
an integration phase bINTj (bINT1 and bINT2 in FIG. 13, bINT1 in FIG. 14) starting at the end of phase bINITPDj which corresponds, in this example, to the switching to the non-conductive state of the transistor AB of each pixel Pixi in the group;
a charge transfer phase bTRj (bTR1 and bTR2 in FIG. 13, bTR1 in FIG. 14) corresponding to integration phase bINTj, and here comprising a plurality of successive transfers to the sense nodes SNi of the pixels Pixi in the group and a plurality of successive transfers to the sense nodes SNbi of the pixels Pixi in the group, the transfers to nodes SNi and the transfers to nodes SNbi being alternated;
a readout phase bRDj (bRD1 and bRD2 in FIG. 13, bRD1 in FIG. 14) implemented after this transfer phase bTRj, to read a signal level of the sense nodes SNi of the pixels in the group and, for example simultaneously, a signal level of the sense nodes SNbi of the pixels in the group; and
after this phase bRDj of reading of the signal levels of the nodes SNi, SNbi in the group, a repeating of the above phases.

In the example of FIGS. 13 and 14, the signals VAB for controlling the transistors AB of pixels Pixi are not shown, and each phase bINITPDj is very schematically shown by a duration corresponding to its implementation.

In this example where each phase bINITPDj corresponds to the conductive state of the transistors AB of the pixels of group Gj, each phase bINITDj is thus likely not to be implemented, totally or partly, during a corresponding phase bINITSNj as shown in FIGS. 13 and 14.

In these examples, each reading of a signal level of the nodes SNi of the pixels Pixi of a group Gj comprises the succession of a transfer phase bTRj and of a readout phase RDj, and the control circuit is configured to keep non-conductive each initialization transistor connected between the node SNi of a pixel Pixi of said group Gj and either the node SNi of a pixel Pixi of another group Gj, or node 100, from the end of this phase bTRj to the beginning of this phase bRDj.

Further, in these examples, a correlated double sampling is implemented. Thus, for each integration phase bINTj of each group Gj, there is a second readout phase bRDj to read an initialization level of the nodes SNi of the pixels Pixi in the group. This second phase bRDj is implemented after a corresponding initialization phase bINITSNj, and, in these examples, before the beginning of the next phase bTRj (or bINTj).

In these examples, each reading of an initialization level of the nodes SNi of the pixels Pixi of a group Gj comprises the succession of a phase bINITSNj and of a readout phase RDj, and the control circuit is configured to keep non-conductive each initialization transistor connected between the node SNi of a pixel Pixi of said group Gj and either the node SNi of a pixel Pixi of another group Gj, or node 100, from the end of this phase bNIITSNj to the beginning of this phase bRDj.

As an example, in FIGS. 13 and 14, each phase bINITPDj ends after the reading of an initialization level of the sense nodes of the pixels Pixi of group Gj.

Thus, FIG. 13 is similar to FIG. 9, and FIG. 14 is similar to FIG. 10, with the difference that:

each integration phase bINTj is one and the same as, or corresponds to, a transfer phase bTRj;

each phase bTRj comprises a plurality of successive transfers to the nodes SNi of the pixels of group Gj, each transfer to nodes SNi corresponding to a setting to the conductive state of the transfer gates of the pixels Pixi in the group; and each initialization phase bINITPDj is, in this example, implemented by a setting to the conductive state of transistor AB, signal VAB not being illustrated in FIG. 13.

As it has already been indicated for a global shutter operation, each phase of reading of a sense node may comprise a storage, by the readout circuit connected to this sense node, of the initialization or signal level read from this sense node, the stored signal(s) being then read from this readout circuit, during a phase of reading of pixel Pixi, for example when the sensor pixels are read one row after the other and simultaneously in each row.

In the example of FIG. 13, the sensor operates in extended dynamic range and in each group Gj, the nodes of each group see, at the end of each phase bINITSNj of initialization of the nodes in this group, the same charge injection resulting from the setting to the non-conductive state of each transistor RSTi connected between a node SNi of a pixel of a group Gj and node 100 or a node SNi of a pixel of another group Gj. This is implemented in the same way as indicated in relation with FIG. 10, by shifting the end of phases bINITSNj.

In the examples of embodiments described hereabove in relation with FIGS. 1 to 10, each phase INITPDi or bINITPDj comprises a setting to the conductive state, during a corresponding phase INITSNi or bINITPDj, of the gate TGi connected to each photodiode PDi concerned by this phase, while, in the examples of embodiments described in relation with FIGS. 10 to 14, INITPDi or bINITPDj comprises a setting to the conductive state, during a corresponding phase INITSNi or bINITPDj, of the photodiode initialization transistor connected to each photodiode PDi concerned by this phase. Those skilled in the art will be capable of providing for the pixels Pixi of FIGS. 1 and 4 to each comprise an additional photodiode initialization transistor, and of accordingly adapting the phases INITPDi described in relation with FIGS. 2, 5, and 8 and the phases bINITPDj described in relation with FIGS. 3, 6, 7, 9, and 10. Similarly, those skilled in the art will be capable of adapting the phases INITPDi described in relation with FIG. 12 and the phases bINITPDj described in relation with FIGS. 13 and 14, in the case where each of these phases INITPDi, respectively bINITPDj, is implemented during a corresponding phase INITSNi, respectively bINITSNj, and comprises a setting to the conductive state of the transfer gates of the concerned pixels Pixi.

In the examples of embodiments described hereinabove in relation with FIGS. 1 to 14, the N successive pixels are taken in a same column. Those skilled in the art will be capable of adapting the description made of these embodiments to the case where the N successive pixels form part of a same row comprising one or a plurality of associations of N successive pixels.

Various embodiments and variants have been described. Those skilled in the art will understand that certain features of these various embodiments and variants may be combined, and other variants will occur to those skilled in the art.

Finally, the practical implementation of the described embodiments and variations is within the abilities of those skilled in the art based on the functional indications given hereinabove.

What is claimed is:

1. A light sensor comprising:
an array of pixels arranged in rows and in columns; and
a control circuit coupled to the array of pixels;
wherein each pixel comprises a photodiode, a sense node coupled to the photodiode, and an initialization transistor connected to the sense node;
wherein N successive pixels of a column or of a row are associated, N being an integer greater than or equal to 2;
wherein the initialization transistor of a first one of the N pixels arranged at one end of the association of the N pixels is connected between the sense node of the first one of the pixels and a node of application of an initialization potential;
wherein for each two successive pixels among the N pixels, the initialization transistor of one of the two pixels that is the most distant from the end is connected between the sense nodes of the two pixels;
wherein the control circuit is configured to implement phases of initialization of the sense nodes of the N pixels, and, for each phase of initialization of the sense node of each of the N pixels, to keep in a conductive state simultaneously the initialization transistors coupling the sense node to the node of application of the initialization potential;
wherein the control circuit is configured, in a first operating mode where the N pixels are distributed in groups of successive pixels among the N pixels, and for each group, to keep in the conductive state the initialization transistor connected between the sense nodes of each two successive pixels of the group; and
wherein the control circuit is configured, for each simultaneous initialization phase in the pixels of two successive groups, to:
end the phase of initialization of the pixels of that of the two groups which is most distant from the node of application of the initialization potential by switching to a non-conductive state the initialization transistor of that of the pixels of the group which is closest to the node of application of the initialization potential, and
then end the phase of initialization of the pixels of that of the two groups which is closest to the node of application of the initialization potential by switching to the non-conductive state the initialization transistor of that of the pixels of the group which is closest to the node of application of the initialization potential.

2. The sensor according to claim 1, wherein the control circuit is configured, in the first operating mode further comprising, for each group first phases of transfer of photogenerated charges to the sense nodes of the pixels in the group, and for each group, to keep in a non-conductive state each initialization transistor connected between the sense node of a pixel of the group and the sense node of a pixel of another one of the groups or the node of application of the initialization potential, during each first phase of transfer of photogenerated charges to the sense nodes of the pixels of the group.

3. The sensor according to claim 2, wherein each pixel further comprises a transfer gate coupling the sense node of the pixel to the photodiode of the pixel, and wherein the control circuit is configured to control, for each group and simultaneously for each pixel of the group, a single switching to the conductive state of the transfer gate of the pixel at each first phase of charge transfer to the sense nodes of the pixels of the group.

4. The sensor according to claim 3, wherein:
the control circuit is configured, in a second operating mode comprising second phases of transfer of photogenerated charges to the sense nodes of the N pixels, and for each of the N pixels, to keep in the non-conductive state each initialization transistor connected to the sense node of the pixel during each second phase of charge transfer to the sense node of the pixel; and
the control circuit is configured, for each of the N pixels, to control a single switching to the conductive state of the transfer gate of the pixel at each second phase of charge transfer to the sense node of the pixel, or to control a plurality of switchings to the conductive state of the transfer gate of the pixel at each second phase of charge transfer to the sense node of the pixel.

5. The sensor according to claim 2, wherein the control circuit is configured, in the first operating mode further comprising, for each group, first phases of reading from the sense nodes of the pixels of the group, and, for each group, to keep in the non-conductive state each initialization transistor connected between the sense node of a pixel of the group and the sense node of a pixel of another one of the groups or the node of application of the initialization potential during each first phase of reading of the sense nodes of the pixels in the group.

6. The sensor according to claim 5, wherein the control circuit is configured, in the first operating mode, for each group and for each reading of a signal level of the group successively comprising a first phase of transfer of photogenerated charges to the sense nodes of the pixels in the group and a first phase of reading of the sense nodes of the pixels in the group, to keep in the non-conductive state each initialization transistor connected between the sense node of a pixel of the group and the sense node of a pixel of another one of the groups or the node of application of the initialization potential, from the first phase of transfer to a first readout phase.

7. The sensor according to claim 5, wherein the control circuit is configured, in the first operating mode, for each group and for each reading of an initialization level of the group successively comprising a phase of simultaneous initialization in all the pixels of the group and a first phase of reading of the sense nodes of the pixels in the group, to keep in the non-conductive state each initialization transistor connected between the sense node of a pixel of the group and the sense node of a pixel of another one of the groups or the node of application of the initialization potential, from the initialization phase to a first readout phase.

8. The sensor according to claim 1, wherein the control circuit is configured, for each second phase of simultaneous initialization in two successive pixels among the N pixels, to:
end the second phase of initialization of that of the two pixels which is most distant from the node of application of the initialization potential by switching to the non-conductive state the initialization transistor of the pixel, and
then end the second phase of initialization of that of the two pixels which is closest to the node of application of the initialization potential by switching to the non-conductive state the initialization transistor of the pixel.

9. The sensor according to claim 1, wherein the control circuit is configured, in a second operating mode that comprises second phases of transfer of photogenerated charges to the sense nodes of the N pixels, and for each of the N pixels, to keep in a non-conductive state each initialization transistor connected to the sense node of the pixel during each second phase of charge transfer to the sense node of the pixel.

10. The sensor according to claim 9, wherein the control circuit is configured, in the second operating mode further comprising second phases of reading from the sense nodes of the N pixels, and for each of the N pixels, to keep in the non-conductive state each initialization transistor connected to the sense node of the pixel during each second phase of reading from the sense node of the pixel.

11. The sensor according to claim 10, wherein the control circuit is configured, in the second operating mode, for each of the N pixels and for each reading of a signal level of the pixel successively comprising a second phase of transfer of photogenerated charges to the sense node of the pixel and a second phase of reading of sense node of the pixel, to keep in the non-conductive state the initialization transistor connected to the sense node, from the second phase of transfer to a second readout phase.

12. The sensor according to claim 10, wherein the control circuit is configured, in the second operating mode, for each of the N pixels and for each reading of a signal level of the pixel successively comprising a phase of initialization of the sense node of the pixel and a second phase of reading from the sense node of the pixel, to keep in the non-conductive state each initialization transistor connected to the sense node, from the second phase of transfer to a second readout phase.

13. A light sensor comprising:
an array of pixels arranged in rows and in columns; and
a control circuit coupled to the array of pixels;
wherein each pixel comprises a photodiode, a sense node coupled to the photodiode, an initialization transistor connected to the sense node of each pixel, and a transfer gate coupling the sense node of the pixel to the photodiode of the pixel;
wherein N successive pixels of a column or of a row are associated, N being an integer greater than or equal to 2;
wherein the initialization transistor of a first one of the N pixels arranged at one end of the association of the N pixels is connected between the sense node of the first one of the pixels and a node of application of an initialization potential;
wherein for each two successive pixels among the N pixels, the initialization transistor of one of the two pixels that is the most distant from the end is connected between the sense nodes of the two pixels; and
wherein the control circuit is configured to:
implement phases of initialization of the sense nodes of the N pixels, and, for each phase of initialization of the sense node of each of the N pixels, to keep in a conductive state simultaneously the initialization transistors coupling the sense node to the node of application of the initialization potential;
in a first operating mode where the N pixels are distributed in groups of successive pixels among the N pixels, and for each group, to keep in the conductive state the initialization transistor connected between the sense nodes of each two successive pixels of the group;

in the first operating mode further comprising, for each group first phases of transfer of photogenerated charges to the sense nodes of the pixels in the group, and for each group, to keep in a non-conductive state each initialization transistor connected between the sense node of a pixel of the group and the sense node of a pixel of another one of the groups or the node of application of the initialization potential, during each first phase of transfer of photogenerated charges to the sense nodes of the pixels of the group;

for each group and simultaneously for each pixel of the group, to control a plurality of successive switchings to the conductive state of the transfer gate of the pixel at each first charge transfer phase to the sense nodes of the pixels of the group; and wherein the control circuit is configured, for each simultaneous initialization phase in the pixels of two successive groups, to:

end the phase of initialization of the pixels of that of the two groups which is most distant from the node of application of the initialization potential by switching to a non-conductive state the initialization transistor of that of the pixels of the group which is closest to the node of application of the initialization potential, and then end the phase of initialization of the pixels of that of the two groups which is closest to the node of application of the initialization potential by switching to the non-conductive state the initialization transistor of that of the pixels of the group which is closest to the node of application of the initialization potential.

14. The sensor according to claim 13, wherein the control circuit is configured, for each second phase of simultaneous initialization in two successive pixels among the N pixels, to:

end the second phase of initialization of that of the two pixels which is most distant from the node of application of the initialization potential by switching to the non-conductive state the initialization transistor of the pixel, and then end the second phase of initialization of that of the two pixels which is closest to the node of application of the initialization potential by switching to the non-conductive state the initialization transistor of the pixel.

15. A method of operating a light sensor that comprises an array of pixels arranged in rows and in columns and a control circuit coupled to the array of pixels, wherein each pixel comprises a photodiode, a sense node coupled to the photodiode, an initialization transistor connected to the sense node of each pixel, and a transfer gate coupling the sense node of the pixel to the photodiode of the pixel, wherein N successive pixels of a column or of a row are associated, N being an integer greater than or equal to 2, wherein the initialization transistor of a first one of the N pixels arranged at one end of the association of the N pixels is connected between the sense node of the first one of the pixels and a node of application of an initialization potential, and wherein for each two successive pixels among the N pixels, the initialization transistor of one of the two pixels that is the most distant from the end is connected between the sense nodes of the two pixels, the method comprising:

implementing phases of initialization of the sense nodes of the N pixels, and, for each phase of initialization of the sense node of each of the N pixels, keeping in a conductive state simultaneously the initialization transistors coupling the sense node to the node of application of the initialization potential;

in a first operating mode where the N pixels are distributed in groups of successive pixels among the N pixels, and for each group, keeping in the conductive state the initialization transistor connected between the sense nodes of each two successive pixels of the group; and for each group first phases of transfer of photogenerated charges to the sense nodes of the pixels in the group, and for each group, keeping in a non-conductive state each initialization transistor connected between the sense node of a pixel of the group and the sense node of a pixel of another one of the groups or the node of application of the initialization potential, during each first phase of transfer of photogenerated charges to the sense nodes of the pixels of the group; and in a second operating mode that comprises second phases of transfer of photogenerated charges to the sense nodes of the N pixels, for each of the N pixels keeping in the non-conductive state each initialization transistor connected to the sense node of the pixel during each second phase of charge transfer to the sense node of the pixel;

controlling a single switching to the conductive state of a transfer gate of the pixel at each second phase of charge transfer to the sense node of the pixel, or controlling a plurality of switchings to the conductive state of the transfer gate of the pixel at each second phase of charge transfer to the sense node of the pixel; and for each simultaneous initialization phase in the pixels of two successive groups:

ending the phase of initialization of the pixels of that of the two groups that is most distant from the node of application of the initialization potential by switching to a non-conductive state the initialization transistor of that of the pixels of the group which is closest to the node of application of the initialization potential, and then ending the phase of initialization of the pixels of that of the two groups which is closest to the node of application of the initialization potential by switching to the non-conductive state the initialization transistor of that of the pixels of the group which is closest to the node of application of the initialization potential.

* * * * *